United States Patent
Ellisor et al.

(10) Patent No.: US 12,366,245 B1
(45) Date of Patent: Jul. 22, 2025

(54) CONNECTING ROD ASSEMBLY FOR RECIPROCATING PUMP

(71) Applicant: Vulcan Industrial Holdings, LLC, Houston, TX (US)

(72) Inventors: Kyle Matthew Ellisor, Katy, TX (US); Chance Ray Mullins, Spring, TX (US)

(73) Assignee: Vulcan Industrial Holdings, LLC, Houston, TX (US)

( * ) Notice: Subject to any disclaimer, the term of this patent is extended or adjusted under 35 U.S.C. 154(b) by 413 days.

(21) Appl. No.: 17/458,754

(22) Filed: Aug. 27, 2021

Related U.S. Application Data

(60) Provisional application No. 63/071,137, filed on Aug. 27, 2020.

(51) Int. Cl.
  *F04B 53/14* (2006.01)
  *F04B 19/22* (2006.01)
  *F04B 53/18* (2006.01)
  *F16C 5/00* (2006.01)

(52) U.S. Cl.
  CPC ............ *F04B 53/147* (2013.01); *F04B 19/22* (2013.01); *F04B 53/18* (2013.01); *F16C 5/00* (2013.01)

(58) Field of Classification Search
  CPC ................................. F04B 53/147; F16C 5/00
  See application file for complete search history.

(56) References Cited

U.S. PATENT DOCUMENTS

| | | | |
|---|---|---|---|
| 1,316,539 A | 9/1919 | Ford | |
| 1,364,848 A | 1/1921 | Walsh | |
| 1,576,269 A | 3/1926 | Durant | |
| 1,595,459 A | 8/1926 | Durant | |
| 1,671,139 A | 5/1928 | Wilson | |
| 1,836,068 A | 12/1931 | Goldsberry | |
| 1,873,318 A | 8/1932 | Eason | |
| 1,914,737 A | 6/1933 | Elms | |
| 1,948,628 A | 2/1934 | Penick | |

(Continued)

FOREIGN PATENT DOCUMENTS

| | | |
|---|---|---|
| CN | 2556355 Y | 6/2003 |
| CN | 201149099 | 11/2008 |

(Continued)

OTHER PUBLICATIONS

Karolczuk et al., "Application of the Gaussian Process for Fatigue Life Prediction Under Multiaxial Loading", Mechanical Systems and Signal Processing 167 (2022), Nov. 14, 2021.

(Continued)

*Primary Examiner* — Vicky A Johnson
(74) *Attorney, Agent, or Firm* — Womble Bond Dickinson (US) LLP

(57) ABSTRACT

A connecting rod assembly includes a crosshead for coupling a connecting rod to a plunger, the crosshead having a hole extending through the crosshead. The connecting rod assembly also includes a knuckle cage positioned within the crosshead, the knuckle cage extending through the hole and including a cutout to provide access to a passage formed in the knuckle cage. The connecting rod assembly further includes a knuckle positioned within the passage of the knuckle cage, the knuckle having a mounting surface that is substantially planar, the mounting surface coupling to the connecting rod at a mating end with a substantially planar mating end surface.

13 Claims, 8 Drawing Sheets

(56) References Cited

U.S. PATENT DOCUMENTS

| | | | |
|---|---|---|---|
| 1,963,684 | A | 6/1934 | Shimer |
| 1,963,685 | A | 6/1934 | Shimer |
| 2,011,547 | A | 8/1935 | Campbell |
| 2,069,443 | A | 2/1937 | Hill |
| 2,103,504 | A | 12/1937 | White |
| 2,143,399 | A | 1/1939 | Abercrombie |
| 2,146,709 | A | 2/1939 | Bird |
| 2,151,442 | A | 3/1939 | Hardy |
| 2,163,472 | A | 6/1939 | Shimer |
| 2,252,488 | A | 8/1941 | Bierend |
| 2,304,991 | A | 12/1942 | Foster |
| 2,506,128 | A | 5/1950 | Ashton |
| 2,539,996 | A | 1/1951 | Gleitz |
| 2,547,831 | A | 4/1951 | Mueller |
| 2,713,522 | A | 7/1955 | Lorenz |
| 2,719,737 | A | 10/1955 | Fletcher |
| 2,745,631 | A | 5/1956 | Shellman |
| 2,756,960 | A | 7/1956 | Church |
| 2,898,082 | A | 8/1959 | Von Almen |
| 2,969,951 | A | 1/1961 | Walton |
| 2,977,874 | A | 4/1961 | Ritzerfeld et al. |
| 2,982,515 | A | 5/1961 | Clinton |
| 2,983,281 | A | 5/1961 | Bynum |
| 3,049,082 | A | 8/1962 | Barry |
| 3,053,500 | A | 9/1962 | Atkinson |
| 3,063,467 | A | 11/1962 | Roberts, Jr. |
| 3,224,817 | A | 12/1965 | Carter |
| 3,276,390 | A | 10/1966 | Bloudoff |
| 3,277,837 | A | 10/1966 | Pangbum |
| 3,288,475 | A | 11/1966 | Benoit |
| 3,459,363 | A | 8/1969 | Miller |
| 3,474,808 | A | 10/1969 | Elliott |
| 3,483,885 | A | 12/1969 | Leathers |
| 3,489,098 | A | 1/1970 | Roth |
| 3,489,170 | A | 1/1970 | Lemar |
| 3,512,787 | A | 5/1970 | Kennedy |
| 3,590,387 | A | 6/1971 | Landis |
| 3,640,501 | A | 2/1972 | Walton |
| 3,698,726 | A | 10/1972 | Schettler |
| 3,809,508 | A | 5/1974 | Uchiyama |
| 3,847,511 | A | 11/1974 | Cole |
| 3,907,307 | A | 9/1975 | Maurer |
| 3,931,755 | A | 1/1976 | Hatridge |
| 4,044,834 | A | 8/1977 | Perkins |
| 4,076,212 | A | 2/1978 | Leman |
| 4,184,814 | A | 1/1980 | Parker |
| 4,219,204 | A | 8/1980 | Pippert |
| 4,277,229 | A | 7/1981 | Pacht |
| 4,306,728 | A | 12/1981 | Huperz |
| 4,331,741 | A | 5/1982 | Wilson |
| 4,395,050 | A | 7/1983 | Wirz |
| 4,398,731 | A | 8/1983 | Gorman |
| 4,440,404 | A | 4/1984 | Roach |
| 4,500,267 | A | 2/1985 | Birdwell |
| 4,508,133 | A | 4/1985 | Hamid |
| 4,518,359 | A | 5/1985 | Yao-Psong |
| 4,527,806 | A | 7/1985 | Ungchusri |
| 4,565,297 | A | 1/1986 | Korner |
| 4,662,392 | A | 5/1987 | Vadasz |
| 4,754,950 | A | 7/1988 | Tada |
| 4,763,876 | A | 8/1988 | Oda |
| 4,768,933 | A | 9/1988 | Stachowiak |
| 4,770,206 | A | 9/1988 | Sjoberg |
| 4,807,890 | A | 2/1989 | Gorman |
| 4,811,758 | A | 3/1989 | Piper |
| 4,861,241 | A | 8/1989 | Gamboa |
| 4,872,395 | A * | 10/1989 | Bennitt ............... F16C 7/023 92/158 |
| 4,878,815 | A | 11/1989 | Stachowiak |
| 4,919,719 | A | 4/1990 | Abe |
| 4,951,707 | A | 8/1990 | Johnson |
| 5,020,490 | A | 6/1991 | Seko |
| 5,052,435 | A | 10/1991 | Crudup |
| 5,061,159 | A | 10/1991 | Pryor |
| 5,062,450 | A | 11/1991 | Bailey |
| 5,073,096 | A | 12/1991 | King et al. |
| 5,080,713 | A | 1/1992 | Ishibashi |
| 5,088,521 | A | 2/1992 | Johnson |
| 5,127,807 | A | 7/1992 | Eslinger |
| 5,131,666 | A | 7/1992 | Hutchens |
| 5,135,238 | A | 8/1992 | Wells |
| 5,149,107 | A | 9/1992 | Maringer |
| 5,201,491 | A | 4/1993 | Domangue |
| 5,209,495 | A | 5/1993 | Palmour |
| 5,249,600 | A | 10/1993 | Blume |
| 5,267,736 | A | 12/1993 | Pietsch |
| 5,273,570 | A | 12/1993 | Sato |
| 5,299,812 | A | 4/1994 | Brestel |
| 5,314,659 | A | 5/1994 | Hidaka |
| 5,362,215 | A | 11/1994 | King |
| 5,382,057 | A | 1/1995 | Richter |
| 5,478,048 | A | 12/1995 | Salesky |
| 5,493,951 | A | 2/1996 | Harrison |
| 5,533,245 | A | 7/1996 | Stanton |
| 5,540,570 | A | 7/1996 | Schuller |
| 5,572,920 | A | 11/1996 | Kennedy |
| 5,626,345 | A | 5/1997 | Wallace |
| 5,636,688 | A | 6/1997 | Bassinger |
| 5,674,449 | A | 10/1997 | Liang |
| 5,834,664 | A | 11/1998 | Aonuma |
| 5,859,376 | A | 1/1999 | Ishibashi |
| 5,895,517 | A | 4/1999 | Kawamura |
| 5,924,853 | A | 7/1999 | Pacht |
| 5,949,003 | A | 9/1999 | Aoki |
| 6,139,599 | A | 10/2000 | Takahashi |
| 6,200,688 | B1 | 3/2001 | Liang |
| 6,209,445 | B1 | 4/2001 | Roberts, Jr. |
| 6,328,312 | B1 | 12/2001 | Schmitz |
| 6,340,377 | B1 | 1/2002 | Kawata |
| 6,382,940 | B1 | 5/2002 | Blume |
| 6,436,338 | B1 | 8/2002 | Qiao |
| 6,446,939 | B1 | 9/2002 | Hoppe |
| 6,460,620 | B1 | 10/2002 | LaFleur |
| 6,464,749 | B1 | 10/2002 | Kawase |
| 6,482,275 | B1 | 11/2002 | Qiao |
| 6,485,678 | B1 | 11/2002 | Liang |
| 6,544,012 | B1 | 4/2003 | Blume |
| 6,571,684 | B1 * | 6/2003 | Nov ............... F16J 1/18 92/187 |
| 6,623,259 | B1 | 9/2003 | Blume |
| 6,634,236 | B2 | 10/2003 | Mars |
| 6,641,112 | B2 | 11/2003 | Antoff |
| 6,695,007 | B2 | 2/2004 | Vicars |
| 6,702,905 | B1 | 3/2004 | Qiao |
| 6,880,802 | B2 | 4/2005 | Hara |
| 6,910,871 | B1 | 6/2005 | Blume |
| 6,916,444 | B1 | 7/2005 | Liang |
| 6,951,165 | B2 | 10/2005 | Kuhn |
| 6,951,579 | B2 | 10/2005 | Koyama |
| 6,955,181 | B1 | 10/2005 | Blume |
| 6,959,916 | B2 | 11/2005 | Chigasaki |
| 7,000,632 | B2 | 2/2006 | McIntire |
| 7,036,824 | B2 | 5/2006 | Kunz |
| 7,144,440 | B2 | 12/2006 | Ando |
| 7,168,440 | B1 | 1/2007 | Blume |
| 7,186,097 | B1 | 3/2007 | Blume |
| 7,222,837 | B1 | 5/2007 | Blume |
| 7,290,560 | B2 | 11/2007 | Orr |
| 7,296,591 | B2 | 11/2007 | Moe |
| 7,335,002 | B2 | 2/2008 | Vicars |
| 7,341,435 | B2 | 3/2008 | Vicars |
| 7,398,955 | B2 | 7/2008 | Weingarten |
| 7,506,574 | B2 | 3/2009 | Jensen |
| 7,513,483 | B1 | 4/2009 | Blume |
| 7,513,759 | B1 | 4/2009 | Blume |
| 7,562,675 | B2 | 7/2009 | Nomichi et al. |
| 7,611,590 | B2 | 11/2009 | Liang |
| 7,681,589 | B2 | 3/2010 | Schwegman |
| 7,682,471 | B2 | 3/2010 | Levin |
| 7,726,026 | B1 | 6/2010 | Blume |
| 7,748,310 | B2 | 7/2010 | Kennedy |
| 7,754,142 | B2 | 7/2010 | Liang |
| 7,754,143 | B2 | 7/2010 | Qiao |
| 7,757,396 | B2 | 7/2010 | Sawada |

(56) References Cited

U.S. PATENT DOCUMENTS

| | | |
|---|---|---|
| 7,789,133 B2 | 9/2010 | McGuire |
| 7,789,161 B2 | 9/2010 | Riley |
| 7,793,913 B2 | 9/2010 | Hara |
| 7,828,053 B2 | 11/2010 | McGuire |
| 7,845,413 B2 | 12/2010 | Shampine |
| 7,861,738 B2 | 1/2011 | Erbes |
| 7,866,346 B1 | 1/2011 | Walters |
| 7,891,374 B2 | 2/2011 | Vicars |
| 7,954,510 B2 | 6/2011 | Schwegman |
| 7,992,635 B2 | 8/2011 | Cherewyk |
| 8,069,923 B2 | 12/2011 | Blanco |
| 8,075,661 B2 | 12/2011 | Chen |
| 8,083,506 B2 | 12/2011 | Maki |
| 8,100,407 B2 | 1/2012 | Stanton |
| 8,141,849 B1 | 3/2012 | Blume |
| 8,147,227 B1 | 4/2012 | Blume |
| 8,181,970 B2 | 5/2012 | Smith |
| 8,261,771 B2 | 9/2012 | Witkowski |
| 8,287,256 B2 | 10/2012 | Shafer |
| 8,291,927 B2 | 10/2012 | Johnson |
| 8,317,498 B2 | 11/2012 | Gambier |
| 8,375,980 B2 | 2/2013 | Higashiyama |
| 8,376,723 B2 | 2/2013 | Kugelev |
| 8,402,880 B2 | 3/2013 | Patel |
| 8,430,075 B2 | 4/2013 | Qiao |
| D687,125 S | 7/2013 | Hawes |
| 8,479,700 B2 | 7/2013 | Qiao |
| 8,489,170 B2 | 7/2013 | Marino |
| 8,511,218 B2 | 8/2013 | Cordes |
| 8,522,667 B2 | 9/2013 | Clemens |
| 8,528,585 B2 | 9/2013 | McGuire |
| 8,529,230 B1 | 9/2013 | Colley, III et al. |
| 8,534,691 B2 | 9/2013 | Schaffer |
| 8,613,886 B2 | 12/2013 | Qiao |
| D700,682 S | 3/2014 | Bayyouk et al. |
| 8,662,864 B2 | 3/2014 | Bayyouk |
| 8,662,865 B2 | 3/2014 | Bayyouk |
| 8,668,470 B2 | 3/2014 | Bayyouk |
| 8,707,853 B1 | 4/2014 | Dille |
| 8,733,313 B2 | 5/2014 | Sato |
| 8,784,081 B1 | 7/2014 | Blume |
| 8,828,312 B2 | 9/2014 | Yao |
| 8,870,554 B2 | 10/2014 | Kent |
| 8,893,806 B2 | 11/2014 | Williamson |
| 8,894,392 B1 | 11/2014 | Blume |
| 8,915,722 B1 | 12/2014 | Blume |
| 8,940,110 B2 | 1/2015 | Qiao |
| 8,978,695 B2 | 3/2015 | Witkowski |
| 8,998,593 B2 | 4/2015 | Vicars |
| 9,010,412 B2 | 4/2015 | McGuire |
| 9,103,448 B2 | 8/2015 | Witkowski |
| 9,150,945 B2 | 10/2015 | Bei |
| 9,157,136 B2 | 10/2015 | Chou |
| 9,157,468 B2 | 10/2015 | Dille |
| 9,206,910 B2 | 12/2015 | Kahn |
| D748,228 S | 1/2016 | Bayyouk |
| 9,260,933 B2 | 2/2016 | Artherholt |
| 9,261,195 B2 | 2/2016 | Toynbee |
| 9,273,543 B2 | 3/2016 | Baca |
| 9,284,631 B2 | 3/2016 | Radon |
| 9,284,953 B2 | 3/2016 | Blume |
| 9,285,040 B2 | 3/2016 | Forrest |
| 9,291,274 B1 | 3/2016 | Blume |
| 9,322,243 B2 | 4/2016 | Baca |
| 9,334,547 B2 | 5/2016 | Qiao |
| 9,340,856 B2 | 5/2016 | Otobe |
| 9,359,921 B2 | 6/2016 | Hashimoto |
| 9,365,913 B2 | 6/2016 | Imaizumi |
| 9,371,919 B2 | 6/2016 | Forrest |
| 9,376,930 B2 | 6/2016 | Kim |
| 9,377,019 B1 | 6/2016 | Blume |
| 9,382,940 B2 | 7/2016 | Lee |
| 9,416,887 B2 | 8/2016 | Blume |
| 9,435,454 B2 | 9/2016 | Blume |
| 9,441,776 B2 | 9/2016 | Bryne |
| 9,458,743 B2 | 10/2016 | Qiao |
| 9,464,730 B2 | 10/2016 | Bihlet |
| 9,500,195 B2 | 11/2016 | Blume |
| 9,506,382 B2 | 11/2016 | Yeager |
| 9,528,508 B2 | 12/2016 | Thomeer |
| 9,528,631 B2 | 12/2016 | McCarty |
| 9,534,473 B2 | 1/2017 | Morris |
| 9,534,691 B2 | 1/2017 | Miller |
| 9,556,761 B2 | 1/2017 | Koyama |
| 9,568,138 B2 | 2/2017 | Arizpe |
| 9,605,767 B2 | 3/2017 | Chhabra |
| 9,631,739 B2 | 4/2017 | Belshan |
| D787,029 S | 5/2017 | Bayyouk |
| 9,638,075 B2 | 5/2017 | Qiao |
| 9,638,337 B2 | 5/2017 | Witkowski |
| 9,650,882 B2 | 5/2017 | Zhang |
| 9,651,067 B2 | 5/2017 | Beschomer |
| 9,689,364 B2 | 6/2017 | Mack |
| 9,695,812 B2 | 7/2017 | Dille |
| 9,732,746 B2 | 8/2017 | Chandrasekaran |
| 9,732,880 B2 | 8/2017 | Haines |
| 9,745,968 B2 | 8/2017 | Kotapish |
| 9,784,262 B2 | 10/2017 | Bayyouk |
| 9,791,082 B2 | 10/2017 | Baxter et al. |
| 9,822,894 B2 | 11/2017 | Bayyouk |
| 9,845,801 B1 | 12/2017 | Shek |
| 9,857,807 B2 | 1/2018 | Baca |
| 9,915,250 B2 | 3/2018 | Brasche |
| 9,920,615 B2 | 3/2018 | Zhang |
| 9,927,036 B2 | 3/2018 | Dille |
| 9,945,362 B2 | 4/2018 | Skurdalsvold |
| 9,945,375 B2 | 4/2018 | Zhang |
| 9,989,044 B2 | 6/2018 | Bayyouk |
| 10,029,540 B2 | 7/2018 | Seeger |
| D826,281 S | 8/2018 | Mead |
| 10,041,490 B1 | 8/2018 | Jahnke |
| 10,082,137 B2 | 9/2018 | Graham |
| 10,094,478 B2 | 10/2018 | Iijima |
| 10,113,679 B2 | 10/2018 | Shuck |
| 10,184,470 B2 | 1/2019 | Barnett, Jr. |
| 10,190,197 B2 | 1/2019 | Baker |
| 10,197,172 B2 | 2/2019 | Fuller |
| 10,215,172 B2 | 2/2019 | Wood |
| 10,221,848 B2 | 3/2019 | Bayyouk |
| 10,240,594 B2 | 3/2019 | Bamhouse, Jr. |
| 10,240,597 B2 | 3/2019 | Bayyouk |
| 10,247,182 B2 | 4/2019 | Zhang |
| 10,247,184 B2 | 4/2019 | Chunn |
| 10,273,954 B2 | 4/2019 | Brown |
| 10,288,178 B2 | 5/2019 | Nowell |
| 10,316,832 B2 | 6/2019 | Byrne |
| 10,330,097 B2 | 6/2019 | Skurdalsvold |
| 10,344,757 B1 | 7/2019 | Stark |
| 10,364,487 B2 | 7/2019 | Park |
| D856,498 S | 8/2019 | Bayyouk |
| 10,378,535 B2 | 8/2019 | Mahmood |
| 10,378,538 B2 | 8/2019 | Blume |
| 10,378,659 B2 | 8/2019 | Scott et al. |
| 10,393,113 B2 * | 8/2019 | Wagner .................. F04B 9/045 |
| 10,400,764 B2 | 9/2019 | Wagner |
| 10,415,348 B2 | 9/2019 | Zhang |
| D861,834 S | 10/2019 | Foster et al. |
| 10,428,406 B2 | 10/2019 | Yao |
| 10,428,949 B2 | 10/2019 | Miller |
| 10,436,193 B1 | 10/2019 | Jahnke |
| 10,443,456 B2 | 10/2019 | Hoeg |
| 10,465,680 B1 | 11/2019 | Guerra |
| 10,472,702 B2 | 11/2019 | Yeh |
| 10,487,528 B2 | 11/2019 | Pozybill |
| D871,455 S | 12/2019 | Crowsley |
| 10,519,070 B2 | 12/2019 | Sanders |
| 10,519,950 B2 | 12/2019 | Foster |
| 10,526,862 B2 | 1/2020 | Witkowski |
| 10,527,036 B2 | 1/2020 | Blume |
| 10,557,446 B2 | 2/2020 | Stecklein |
| 10,557,576 B2 | 2/2020 | Witkowski |
| 10,557,580 B2 | 2/2020 | Mendyk |
| 10,563,494 B2 | 2/2020 | Graham |
| 10,563,649 B2 | 2/2020 | Zhang |

(56) References Cited

U.S. PATENT DOCUMENTS

| | | |
|---|---|---|
| 10,570,491 B2 | 2/2020 | Hong |
| 10,576,538 B2 | 3/2020 | Kato |
| 10,577,580 B2 | 3/2020 | Abbas |
| 10,577,850 B2 | 3/2020 | Ozkan |
| 10,591,070 B2 | 3/2020 | Nowell |
| 10,605,374 B2 | 3/2020 | Takaki |
| D880,661 S | 4/2020 | Foster et al. |
| 10,626,856 B2 | 4/2020 | Coldren |
| 10,633,925 B2 | 4/2020 | Panda |
| 10,634,260 B2 | 4/2020 | Said |
| 10,640,854 B2 | 5/2020 | Hu |
| 10,655,623 B2 | 5/2020 | Blume |
| 10,663,071 B2 | 5/2020 | Bayyouk |
| 10,670,013 B2 | 6/2020 | Foster |
| 10,670,153 B2 | 6/2020 | Filipow |
| 10,670,176 B2 | 6/2020 | Byrne |
| 10,677,109 B2 | 6/2020 | Qiao |
| 10,677,240 B2 | 6/2020 | Graham |
| 10,677,365 B2 | 6/2020 | Said |
| 10,711,567 B2 | 7/2020 | Buckley |
| 10,711,754 B2 | 7/2020 | Nelson |
| 10,711,778 B2 | 7/2020 | Buckley |
| 10,718,441 B2 | 7/2020 | Myers |
| 10,731,523 B2 | 8/2020 | Qu |
| 10,731,643 B2 | 8/2020 | DeLeon |
| 10,738,928 B2 | 8/2020 | Arizpe |
| 10,753,490 B2 | 8/2020 | Fuller |
| 10,753,495 B2 | 8/2020 | Bayyouk |
| 10,767,520 B1 | 9/2020 | Hattiangadi |
| 10,771,567 B2 | 9/2020 | Sundaresan |
| 10,774,828 B1 | 9/2020 | Smith |
| 10,781,803 B2 | 9/2020 | Kumar |
| 10,787,725 B2 | 9/2020 | Fujieda |
| 10,801,627 B2 | 10/2020 | Warbey |
| 10,808,488 B2 | 10/2020 | Witkowski |
| 10,808,851 B1 | 10/2020 | Surjaatmadja et al. |
| 10,815,988 B2 | 10/2020 | Buckley |
| 10,815,989 B2 | 10/2020 | Naedler et al. |
| 10,830,360 B2 | 11/2020 | Frank |
| 10,851,775 B2 | 12/2020 | Stark |
| 10,865,325 B2 | 12/2020 | Nakao |
| 10,895,325 B2 | 1/2021 | Nowell et al. |
| D910,820 S | 2/2021 | Grassl |
| 10,907,738 B2 | 2/2021 | Nowell |
| 10,914,171 B2 | 2/2021 | Foster |
| 10,934,899 B2 | 3/2021 | Hattiangadi |
| 10,941,765 B2 | 3/2021 | Nowell |
| 10,941,866 B2 | 3/2021 | Nowell |
| 10,954,938 B2 | 3/2021 | Stark |
| 10,961,607 B2 | 3/2021 | Oshima |
| 10,962,001 B2 | 3/2021 | Nowell |
| D916,240 S | 4/2021 | Nowell |
| 10,968,717 B2 | 4/2021 | Tran |
| 10,988,834 B2 | 4/2021 | Lee |
| 10,989,321 B2 | 4/2021 | Hattiangadi |
| 10,995,738 B2 | 5/2021 | Blume |
| 11,009,016 B2 | 5/2021 | Berend |
| 11,028,662 B2 | 6/2021 | Rhodes |
| 11,041,570 B1 | 6/2021 | Buckley |
| 11,073,144 B1 | 7/2021 | Hurst et al. |
| 11,078,903 B2 | 8/2021 | Nowell |
| 11,104,981 B2 | 8/2021 | Chen |
| 11,105,185 B2 | 8/2021 | Spencer |
| 11,105,327 B2 | 8/2021 | Hurst |
| 11,105,328 B2 | 8/2021 | Bryne |
| 11,105,428 B2 | 8/2021 | Warbey |
| 11,111,915 B2 | 9/2021 | Bayyouk |
| 11,131,397 B2 | 9/2021 | Yan |
| D933,104 S | 10/2021 | Ellisor |
| D933,105 S | 10/2021 | Ellisor |
| D933,106 S | 10/2021 | Mullins |
| D933,107 S | 10/2021 | Mullins |
| 11,149,514 B2 | 10/2021 | Witkowski |
| 11,156,221 B2 | 10/2021 | Stark et al. |
| 11,162,859 B2 | 11/2021 | Lei |
| 11,181,101 B2 | 11/2021 | Byme |
| 11,181,108 B2 | 11/2021 | Brooks |
| 11,225,963 B2 | 1/2022 | Naedler et al. |
| 11,231,111 B2 | 1/2022 | Hurst |
| 11,242,849 B1 | 2/2022 | Smith |
| D949,202 S | 4/2022 | Sharpstone |
| 11,353,117 B1 | 6/2022 | Smith |
| 11,359,615 B2 | 6/2022 | Thomas et al. |
| 11,384,756 B1 | 7/2022 | Smith |
| 11,391,374 B1 | 7/2022 | Ellisor |
| 11,421,679 B1 | 8/2022 | Mullins |
| 11,421,680 B1 | 8/2022 | Smith |
| 11,434,900 B1 | 9/2022 | Alex |
| 11,441,683 B2 | 9/2022 | Mullins et al. |
| 11,454,321 B2 | 9/2022 | Mullins et al. |
| 11,473,686 B2 | 10/2022 | Bayyouk |
| 11,566,713 B2 | 1/2023 | Poremski |
| D980,876 S | 3/2023 | Smith |
| D986,928 S | 5/2023 | Smith et al. |
| D997,992 S | 9/2023 | Smith et al. |
| 11,746,778 B2 | 9/2023 | Bayyouk |
| 11,761,441 B1 | 9/2023 | Alex et al. |
| D1,006,059 S | 11/2023 | Waniek |
| 11,846,356 B1 | 12/2023 | Ellisor |
| 11,891,988 B2 | 2/2024 | Mullins et al. |
| 11,920,684 B1 | 3/2024 | Xu et al. |
| 12,038,086 B2 | 7/2024 | Shuck |
| 12,049,889 B2 | 7/2024 | Ellisor et al. |
| 12,055,221 B2 | 8/2024 | Ellisor et al. |
| 12,140,240 B1 | 11/2024 | Xu |
| 2002/0084004 A1 | 7/2002 | Takahashi |
| 2002/0124961 A1 | 9/2002 | Porter |
| 2002/0159914 A1 | 10/2002 | Yeh |
| 2003/0205864 A1 | 11/2003 | Dietle |
| 2003/0233910 A1 | 12/2003 | Jeong |
| 2004/0161351 A1 | 8/2004 | Forrest |
| 2004/0170507 A1 | 9/2004 | Vicars |
| 2004/0194576 A1 | 10/2004 | Ando |
| 2004/0234404 A1 | 11/2004 | Vicars |
| 2004/0255410 A1 | 12/2004 | Schonewille |
| 2004/0258557 A1 | 12/2004 | Shun |
| 2005/0095156 A1 | 5/2005 | Wolters |
| 2005/0200081 A1 | 9/2005 | Stanton |
| 2005/0226754 A1 | 10/2005 | Orr |
| 2006/0002806 A1 | 1/2006 | Baxter |
| 2006/0027779 A1 | 2/2006 | McGuire |
| 2006/0045782 A1 | 3/2006 | Kretzinger |
| 2007/0086910 A1 | 4/2007 | Liang |
| 2007/0154342 A1 | 7/2007 | Tu |
| 2007/0261746 A1 | 11/2007 | Nomichi et al. |
| 2007/0273105 A1 | 11/2007 | Stanton |
| 2007/0295411 A1 | 12/2007 | Schwegman |
| 2008/0031769 A1 | 2/2008 | Yeh |
| 2008/0052014 A1 | 2/2008 | Toyosada |
| 2008/0092384 A1 | 4/2008 | Schaake |
| 2008/0240949 A1 | 10/2008 | Tackett et al. |
| 2008/0279706 A1 | 11/2008 | Gambier |
| 2009/0041611 A1 | 2/2009 | Sathian |
| 2009/0261575 A1 | 10/2009 | Bull |
| 2009/0278069 A1 | 11/2009 | Blanco |
| 2010/0143163 A1 | 6/2010 | Patel et al. |
| 2010/0230628 A1 | 9/2010 | Stefina |
| 2010/0272597 A1 | 10/2010 | Qiao |
| 2011/0079302 A1 | 4/2011 | Hawes |
| 2011/0142701 A1 | 6/2011 | Small |
| 2011/0189040 A1 | 8/2011 | Vicars |
| 2011/0255993 A1 | 10/2011 | Ochoa |
| 2011/0296982 A1 | 12/2011 | Dille et al. |
| 2012/0141308 A1 | 6/2012 | Saini |
| 2012/0163969 A1 | 6/2012 | Ongole |
| 2012/0259593 A1 | 10/2012 | El-Zein |
| 2012/0304821 A1 | 12/2012 | Ando |
| 2013/0020521 A1 | 1/2013 | Byme |
| 2013/0037739 A1 | 2/2013 | Millard |
| 2013/0202457 A1 | 8/2013 | Bayyouk |
| 2013/0202458 A1 | 8/2013 | Byme |
| 2013/0263932 A1 | 10/2013 | Baxter et al. |
| 2013/0319220 A1 | 12/2013 | Luharuka |
| 2014/0083541 A1 | 3/2014 | Chandrasekaran |

(56) References Cited

U.S. PATENT DOCUMENTS

| | | |
|---|---|---|
| 2014/0083547 A1 | 3/2014 | Hwang |
| 2014/0196883 A1 | 7/2014 | Artherholt |
| 2014/0260954 A1 | 9/2014 | Young |
| 2014/0286805 A1 | 9/2014 | Dyer |
| 2014/0322034 A1 | 10/2014 | Bayyouk |
| 2014/0322050 A1 | 10/2014 | Marette et al. |
| 2014/0348677 A1 | 11/2014 | Moeller |
| 2015/0127308 A1 | 5/2015 | Thomas, Jr. et al. |
| 2015/0132157 A1 | 5/2015 | Whaley |
| 2015/0144826 A1 | 5/2015 | Bayyouk |
| 2015/0147194 A1 | 5/2015 | Foote |
| 2015/0219096 A1 | 8/2015 | Jain |
| 2015/0300332 A1 | 10/2015 | Kotapish |
| 2015/0368775 A1 | 12/2015 | Baker |
| 2016/0201169 A1 | 7/2016 | Vecchio |
| 2016/0215588 A1 | 7/2016 | Belshan |
| 2016/0238156 A1 | 8/2016 | Hubenschmidt |
| 2016/0245280 A1 | 8/2016 | Todorov |
| 2016/0258433 A1 | 9/2016 | Belshan et al. |
| 2016/0319626 A1 | 11/2016 | Dille |
| 2016/0319805 A1 | 11/2016 | Dille |
| 2016/0327165 A1 | 11/2016 | Sundararajan |
| 2017/0067459 A1 | 3/2017 | Bayyouk |
| 2017/0089334 A1 | 3/2017 | Jahnke |
| 2017/0089470 A1 | 3/2017 | Filipow et al. |
| 2017/0089473 A1 | 3/2017 | Nowell |
| 2017/0097107 A1 | 4/2017 | Hotz |
| 2017/0159655 A1 | 6/2017 | Morreale |
| 2017/0175799 A1 | 6/2017 | Arnold |
| 2017/0204852 A1 | 7/2017 | Barnett, Jr. |
| 2017/0218951 A1 | 8/2017 | Graham |
| 2017/0218993 A1 | 8/2017 | Freed |
| 2017/0297149 A1 | 10/2017 | Shinohara |
| 2017/0298932 A1 | 10/2017 | Wagner |
| 2017/0314097 A1 | 11/2017 | Hong |
| 2017/0342776 A1 | 11/2017 | Bullock |
| 2017/0342976 A1 | 11/2017 | Reddy |
| 2018/0017173 A1 | 1/2018 | Nowell |
| 2018/0058431 A1 | 3/2018 | Blume |
| 2018/0073653 A1 | 3/2018 | Bayyouk |
| 2018/0202434 A1 | 7/2018 | Barnhouse, Jr. |
| 2018/0298894 A1 | 10/2018 | Wagner |
| 2018/0312946 A1 | 11/2018 | Gigliotti, Jr. |
| 2018/0320258 A1 | 11/2018 | Stewart |
| 2018/0340245 A1 | 11/2018 | Kernion |
| 2018/0354081 A1 | 12/2018 | Kalyani |
| 2019/0011051 A1 | 1/2019 | Yeung |
| 2019/0017503 A1 | 1/2019 | Foster |
| 2019/0024198 A1 | 1/2019 | Hong |
| 2019/0024225 A1 | 1/2019 | Tang |
| 2019/0032685 A1 | 1/2019 | Foster |
| 2019/0032720 A1 | 1/2019 | Bayyouk |
| 2019/0047049 A1 | 2/2019 | Fujieda |
| 2019/0049052 A1 | 2/2019 | Shuck |
| 2019/0063427 A1 | 2/2019 | Nowell |
| 2019/0063430 A1 | 2/2019 | Byrne |
| 2019/0071755 A1 | 3/2019 | Lee |
| 2019/0072088 A1 | 3/2019 | DeLeon |
| 2019/0072089 A1 | 3/2019 | Buckley |
| 2019/0085806 A1 | 3/2019 | Meibgeier |
| 2019/0085978 A1 | 3/2019 | Chase |
| 2019/0101109 A1 | 4/2019 | Cortes |
| 2019/0107226 A1 | 4/2019 | Bayyouk |
| 2019/0120389 A1 | 4/2019 | Foster |
| 2019/0136842 A1 | 5/2019 | Nowell |
| 2019/0145400 A1 | 5/2019 | Graham |
| 2019/0145568 A1 | 5/2019 | Nick |
| 2019/0154033 A1 | 5/2019 | Brooks |
| 2019/0170137 A1 | 6/2019 | Chase |
| 2019/0170138 A1 | 6/2019 | Bayyouk |
| 2019/0194786 A1 | 6/2019 | Chuang |
| 2019/0226058 A1 | 7/2019 | Fujieda |
| 2019/0226476 A1 | 7/2019 | Stark et al. |
| 2019/0242373 A1 | 8/2019 | Wernig |
| 2019/0247957 A1 | 8/2019 | Stribling |
| 2019/0264683 A1 | 8/2019 | Smith |
| 2019/0292633 A1 | 9/2019 | Porret |
| 2019/0301314 A1 | 10/2019 | Kamo |
| 2019/0301447 A1 | 10/2019 | Skurdalsvold |
| 2019/0316685 A1 | 10/2019 | Wang |
| 2019/0331245 A1 | 10/2019 | Gable et al. |
| 2019/0360483 A1 | 11/2019 | Nowell |
| 2019/0376508 A1 | 12/2019 | Wagner |
| 2020/0023245 A1 | 1/2020 | Story et al. |
| 2020/0056272 A1 | 2/2020 | Hong |
| 2020/0063899 A1 | 2/2020 | Witkowski |
| 2020/0070034 A1 | 3/2020 | Sukup et al. |
| 2020/0072369 A1 | 3/2020 | Singley et al. |
| 2020/0080660 A1 | 3/2020 | Dyer |
| 2020/0080661 A1 | 3/2020 | Mullins |
| 2020/0157663 A1 | 5/2020 | Yang |
| 2020/0158123 A1 | 5/2020 | Chen |
| 2020/0173317 A1 | 6/2020 | Keating |
| 2020/0208776 A1 | 7/2020 | Bayyouk |
| 2020/0217424 A1 | 7/2020 | Rasmussen |
| 2020/0232455 A1 | 7/2020 | Blume |
| 2020/0240531 A1 | 7/2020 | Nowell |
| 2020/0256149 A1 | 8/2020 | Witkowski |
| 2020/0284253 A1 | 9/2020 | Foster |
| 2020/0284365 A1 | 9/2020 | Bayyouk |
| 2020/0290118 A1 | 9/2020 | Chen |
| 2020/0291731 A1 | 9/2020 | Haiderer |
| 2020/0300240 A1 | 9/2020 | Nowell |
| 2020/0308683 A1 | 10/2020 | Xue |
| 2020/0347843 A1 | 11/2020 | Mullins |
| 2020/0355182 A1 | 11/2020 | DeLeon |
| 2020/0362970 A1 | 11/2020 | Hurst |
| 2020/0392613 A1 | 12/2020 | Won |
| 2020/0393054 A1 | 12/2020 | Fuller |
| 2020/0399979 A1 | 12/2020 | Webster |
| 2020/0400003 A1 | 12/2020 | Webster |
| 2020/0400130 A1 | 12/2020 | Poehls |
| 2020/0400132 A1 | 12/2020 | Kumar |
| 2020/0400140 A1 | 12/2020 | Bayyouk |
| 2020/0400234 A1 | 12/2020 | Mullins et al. |
| 2020/0400242 A1 | 12/2020 | Spencer |
| 2021/0010113 A1 | 1/2021 | Qiao |
| 2021/0010470 A1 | 1/2021 | Blume |
| 2021/0017830 A1 | 1/2021 | Witkowski |
| 2021/0017982 A1 | 1/2021 | Bayyouk |
| 2021/0017983 A1 | 1/2021 | Myers |
| 2021/0040836 A1 | 2/2021 | Baskin |
| 2021/0054486 A1 | 2/2021 | Kim |
| 2021/0102630 A1 | 4/2021 | Nowell |
| 2021/0108734 A1 | 4/2021 | Nowell |
| 2021/0130936 A1 | 5/2021 | Wu |
| 2021/0146397 A1 | 5/2021 | Mittag et al. |
| 2021/0148471 A1 | 5/2021 | Murugesan |
| 2021/0180156 A1 | 6/2021 | Kim |
| 2021/0190053 A1 | 6/2021 | Wagner |
| 2021/0190223 A1 | 6/2021 | Bayyouk |
| 2021/0197524 A1 | 7/2021 | Maroli |
| 2021/0215071 A1 | 7/2021 | Oikawa |
| 2021/0215154 A1 | 7/2021 | Nowell |
| 2021/0230987 A1 | 7/2021 | Tanner |
| 2021/0239111 A1 | 8/2021 | Zitting |
| 2021/0246537 A1 | 8/2021 | Maroli |
| 2021/0260704 A1 | 8/2021 | Hu |
| 2021/0270261 A1 | 9/2021 | Zhang |
| 2021/0285551 A1 | 9/2021 | Renollett |
| 2021/0310484 A1 | 10/2021 | Myers |
| 2021/0381504 A1 | 12/2021 | Wagner |
| 2021/0381615 A1 | 12/2021 | Riedel |
| 2021/0388832 A1 | 12/2021 | Byrne |
| 2022/0026326 A1 | 1/2022 | Wang |
| 2022/0034402 A1 | 2/2022 | Kiani |
| 2022/0056906 A1 | 2/2022 | Lawson et al. |
| 2022/0065063 A1 | 3/2022 | Xu et al. |
| 2022/0163031 A1 | 5/2022 | Chase |
| 2022/0163032 A1 | 5/2022 | Chase |
| 2022/0243723 A1 | 8/2022 | Herold et al. |
| 2022/0282719 A1 | 9/2022 | Barnhouse |
| 2022/0349472 A1 | 11/2022 | Ellisor |
| 2022/0390055 A1 | 12/2022 | Ellisor |

(56) References Cited

U.S. PATENT DOCUMENTS

| | | |
|---|---|---|
| 2022/0403839 A1 | 12/2022 | Mullins |
| 2023/0041201 A1 | 2/2023 | Myers et al. |
| 2023/0129538 A1 | 4/2023 | Miller et al. |
| 2023/0130824 A1 | 4/2023 | Belshan et al. |
| 2023/0184241 A1 | 6/2023 | Avey et al. |
| 2023/0220840 A1 | 7/2023 | Avey et al. |
| 2023/0258175 A1 | 8/2023 | Figgs et al. |
| 2023/0279991 A1 | 9/2023 | Avey et al. |
| 2023/0332596 A1 | 10/2023 | Chase |
| 2023/0383743 A1 | 11/2023 | Brock et al. |
| 2023/0383859 A1 | 11/2023 | Wiegand et al. |
| 2023/0407864 A1 | 12/2023 | Alex et al. |
| 2024/0102460 A1 | 3/2024 | Kachovskiy et al. |
| 2024/0117882 A1 | 4/2024 | Ellisor |
| 2024/0200656 A1 | 6/2024 | Avey |
| 2024/0200666 A1 | 6/2024 | Leake |
| 2024/0369139 A1 | 11/2024 | Ellisor |
| 2024/0376892 A1 | 11/2024 | Ellisor |
| 2024/0376984 A1 | 11/2024 | Ellisor |
| 2024/0418164 A1 | 12/2024 | Peer |
| 2025/0027486 A1 | 1/2025 | Alex et al. |

FOREIGN PATENT DOCUMENTS

| | | |
|---|---|---|
| CN | 102748483 | 10/2012 |
| CN | 202545162 U | 11/2012 |
| CN | 203257342 U | 10/2013 |
| CN | 204040978 U | 12/2014 |
| CN | 104329464 A | 2/2015 |
| CN | 204738957 U | 11/2015 |
| CN | 205315253 U | 6/2016 |
| CN | 109458326 A | 3/2019 |
| CN | 209261799 U | 8/2019 |
| CN | 110374522 A | 10/2019 |
| CN | 209469613 U | 10/2019 |
| CN | 111005695 A | 4/2020 |
| CN | 111073186 A | 4/2020 |
| CN | 102410194 | 4/2021 |
| DE | 102009001560 A1 | 9/2010 |
| DE | 202012104058 U1 | 3/2014 |
| EP | 0 414 955 | 3/1991 |
| EP | 0520567 A1 | 12/1992 |
| EP | 3336356 A1 | 6/2018 |
| EP | 3696408 A1 | 8/2020 |
| WO | 2021195572 | 9/2021 |
| WO | 2022167341 A1 | 8/2022 |
| WO | 2024026432 | 2/2024 |
| WO | 2024076786 A1 | 4/2024 |

OTHER PUBLICATIONS

Carraro et al. "A Damage Based Model for Crack Initiation in Unidirectional Composites Under Multiaxial Cyclic Loading", Composite Science and Technology 99 (2014), 154-163, May 16, 2014.

Albinmousa et al., "Cyclic Axial and Cyclic Torsional Behaviour of Extruded AZ31B Magnesium Alloy", International Journal of Fatigue 33 (2011), 1403-1416, 2011.

Horstemeyer et al., "Universal Material Constants For Multistage Fatigue (MSF) Modeling of the Process-Structure-Property (PSP) Relations of A000, 2000, 5000, and 7000 Series Aluminum Alloys", Integrating Materials and Manufacturing Innovation, vol. 9 (2020), 157-180, Jun. 22, 2020.

Guan et al., "Model Selection, Updating, and Averaging for Probabilistic Fatigue Damage Prognosis", Journal of Structural Safety, Mar. 11, 2011.

Frick et al., "Orientation-Independent Pseudoelasticity in Small-Scale NITI Compression Pillars", Scripta Materialia 59(12), 7-10, 2008.

Naghipour et al., "Fatigue Analysis of Notched Laminates: A Time-Efficient Macro-Mechanical Approach", Ohio Aerospace Institute, Cleveland, 2016.

International Search Report and Written Opinion for international application No. PCT/US2023/066143, mailed Aug. 28, 2023.

International Search Report and Written Opinion for international application No. PCT/US2023/073458, mailed Feb. 1, 2024.

Vulcan, High-Impact Replacement Parts, Fortified Valves and Seats, found at: https://www.vulcanindustrial.com/energy-products/replacement-parts.

Declaration of Duncan Hall from Internet Archive/Wayback Machine, Feb. 3, 2021, Kerr Plunger Pump Manuals, 20 pages.

Michael Agnes, Editor, Webster's New World College Dictionary, Fourth Edition, 1999, 5 pages.

Weir SPM Oil & Gas, Grooveless Fluid End, 2008, 1 page.

Weir SPM Oil & Gas, Weir SPM General Catalog, 2009, 40 pages.

Weir SPM Oil & Gas, Well Service Pump Reference Guide, 2008, 55 pages.

*Intellectual Ventures I LLC v VMWare, Inc.*, Case No. 1:19-CV-01075-ADA, Document 91 (W.D. Tex Jun. 3, 2020), Defendant VMWare, Inc.'s Stipulation of Invalidity Contentions for U.S. Pat. No. 7,949,752, Jun. 3, 2020, 5 pages.

*Vulcan Industrial Holding, LLC et al. v. Kerr Machine Co.* Case No. 4:21-cv-433, Document 1, Complaint for Declaratory Judgment of Patent Non-Infringement, Feb. 9, 2021, 17 pages.

*Trilogy Enterprises, Inc., v. Trilogy Education Services, LLC*, Case. No. 6:19-cv-199-ADA-JCM, Document 35, Fifth Amended Scheduling Order, Sep. 8, 2020, 4 pages.

*Dr. Comeliu Bolbocean v Baylor University*, Case No. 6:19-CV-00465-ADA-JCM, Document 34, Scheduling Order, Apr. 6, 2020, 4 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 4, Plaintiff's Amended Complaint for Patent Infringement and Jury Demand, Jan. 19, 2021, 30 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044, Document 1, Plaintiff's Original Complaint for Patent Infringement land Jury Demand, Jan. 19, 2021, 47 pages.

*Kerr Machine Co., v Vulcan Energy Services, LLC, Vulcan Industrial Holdings, LLC, and Cizion, LLC d/b/a/ Vulcan Industrial Manufacturing*, Case No. 6:21-CV-00044-ADA, Document 10, Plaintiff's Second Amended Complaint for Patent Infringement and Jury Demand, Feb. 1, 2021, 88 pages.

*Kerr Machine Co., v Vulcan Industrial Holdings, LLC, Vulcan Energy Services, LLC, Cizion, LLC*, Case No. W-20-CV-00200-ADA-24, Order Setting Trial Date, Jun. 14, 2020, 1 page.

*Kerr Machine Co., v Vulcan Industrial Holdings, LLC, Vulcan Energy Services, LLC, Cizion, LLC*, Case No. W-20-CV-00200-ADA-29, Order Setting Trial Date, Aug. 2, 2020, 1 page.

*Kerr Machine Co., v. Vulcan Industrial Holdings, LLC*, Case. No. 6:20-CV-00200-ADA, Affidavit of Service, Apr. 7, 2020, 1 page.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Plaintiff's First Amended Complaint for Patent Infringement and Jury Demand, Jun. 4, 2020, 11 pages.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 26, Defendant Cizion, LLC d/b/a Vulcan Industrial Manufacturing, LLC's Motion to Dismiss or Transfer, Jul. 22, 2020, 10 pages.

*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Defendants' Opposed Motion to Stay Litigation Pending the Outcome of the Pending Post-Grant Review Proceeding Before the Patent Trial and Appeal Board, Jul. 31, 2020, 14 pages.

*Kerr Machine Co., v Vulcan Industrial Holdings, LLC*, Case No. 6:20-CV-00200-ADA, Plaintiff's Preliminary Infringement Contentions, May 22, 2020, 50 pages.

*Kerr Machine Co., v Vulcan Industrial Holdings, LLC, Vulcan Energy Services, LLC, and Cizion, LLC d/b/a/ Vulcan Industrial*

(56) References Cited

OTHER PUBLICATIONS

*Manufacturing*, Case No. 6:20-CV-00200-ADA, Defendants' Preliminary Invalidity Contentions, Aug. 13, 2020, 29 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 34, Scheduling Order, Aug. 11, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 38, Plaintiff's Second Amended Complaint for Patent Infringement and Jury Demand, Sep. 25, 2020, 11 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 5, Standing Order regarding Scheduled Hearings In Civil Cases in Light of Chief Judge Garcia's 24 Amended Order, Mar. 24, 2020, 4 pages.
*Kerr Machine Co., v Vulcan Industrial Holdings, LLC, Vulcan Energy Services, LLC, and Cizion, LLC d/b/a/ Vulcan Industrial Manufacturing*, Civil Docket for Case No. 6:20-cv-00200-ADA, accessed Sep. 11, 2020, 7 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Document 54, Claim Construction Order, Dec. 3, 2020, 3 pages.
*Kerr Machine Co., v Vulcan Industrial Holdings, LLC, Vulcan Energy Services, LLC, and Cizion, LLC d/b/a/ Vulcan Industrial Manufacturing*, Case No. 6:20-CV-00200-ADA, Docket Entry, Aug. 2, 2020, 1 page.
*Kerr Machine Co., v Vulcan Industrial Holdings, LLC*, Case No. 6:20-CV-00200, Document 1, Plaintiff's Original Complaint for Patent Infringement and Jury Demand, Mar. 19, 2020, 39 pages.
*Adriana del Rocio Barberena-Rovira, et al., v Kuiper Dairy, LLC, et al.*, Case No. 6:20-CV-00250-ADA-JCM, Document 20, Scheduling Order, Jul. 22, 2020, 4 pages.
*Acquanlan Deonshay Harris v. Cenlar, FSB*, Case No. 6:20-CV-00271-ADA-JCM, Document 13, Scheduling Order, Aug. 20, 2020, 4 pages.
Senior Living Properties, LLC c. Ironshore Speciality, Insurance Company, Case No. 6:20-CV-00282-ADA-JCM, Document 12, Scheduling Order, Jul. 7, 2020, 4 pages.
*Dionne Bracken, Individually and as Next Friend of A.M.B., v Michael D. Ashcraft and Envirovac Waste Transport Systems, Inc.*, Case No. 6:20-CV-00308-ADA-JCM, Document 17, Scheduling Order, Jul. 28, 2020, 4 pages.
*Kendra Coufal v. Roger Lee Thomas and Apple Logistics, Inc.*, Case No. 6:20-CV-00356-ADA-JCM, Document 12, Scheduling Order, Jul. 28, 2020, 4 pages.
*Tipton International, Inc., v. Vetbizcorp, LLC and Samuel Cody*, Case No. 6:20-CV-00554-ADA-JCM, Document 8, Scheduling Order, Aug. 20, 2020, 4 pages.
*Dynaenergetics GmbH & Co. KG and Dynaenergetics US, Inc., v. Hunting Titan, Ltd.; Hunting Titan, Inc.; and Hunting Energy Services, Inc.*, Case No. H-17-3784, Order, Sep. 4, 2020, 2 pages.
Slip Opinion, In re Sand Revolution LLC, Case No. 2020-00145 (Fed. Cir. Sep. 28, 2020), 3 pages.
In re Vulcan Industrial Holdings, LLC, Case No. 2020-00151 (Fed. Cir. Sep. 29, 2020), Petition for Writ of Mandamus, 43 pages.
*Densys Ltd., v. 3Shape Trios A/S and 3Shape A/S*, Case No. WA:19-CV-00680-ADA, Document 27, Scheduling Order, Apr. 8, 2020, 4 pages.
*Kerr Machine Co. vs. Vulcan Industrial Holdings, LLC*, Case No. WA:20-CV-00200-ADA, Order Setting Markman Hearing, May 29, 2020, 1 page.
Sur-Lock Liner Retention System—Product Brochure (p. 16) (Year: 2017).
Sur-Lock Liner Retention System—Video (https://premiumoilfield.com/performance-enhancements/sur-lock/sur-lock-iner-retention-system.html) (https://www.youtube.com/watch?v=6NZGeD5NkF8) (Year: 2017).
U.S. Appl. No. 17/241,680 titled "Fluid End and Center Feed Suction Manifold" filed Apr. 27, 2021.
Flowserve, "Dynamic Balance Plug Valve and Double DB Plug Valve: Installation, Operation and Maintenance, " 2011, https://www.flowserve.com/sites/default/files/2016-07/NVENIM2005-00_0.pdf, 36 pages.
Weir Oil & Gas, "SPM Well Service Pumps & Flow Control Products TWS600S Fluid End Operation Instruction and Service Manual," Feb. 27, 2017, https://www.global.weir/assets/files/oil%20and%20gas%20ebrochures/manuals/tws600s-fluid-end-2p121260.pdf, 41 pages.
White Star Pump Co., "Maintenance Manual: Triplex Pump WS-1300/1600," 2005, http://www.whitestarpump.com/ES/docs/user_t.pdf, 45 pages.
KerrPumps, "Super Stainless Steel Better Than The Best," http://kerrpumps.com/superstainless?gclid=EAlalQobChMlg470482q6wIVilTICh2XPA-qEAAYASAAEgKrxPD_BwE, 2013, last accessed: Aug. 21, 2020, 6 pages.
KerrPumps, "Frac One Pumps—Fluid End—Fracing," http://kerrpumps.com/fracone, 2013, last accessed: Aug. 21, 2020, 3 pages.
KerrPumps, "KerrPumps—Frac Pump & Mud Pump Fluid End—Fluid End Pump, " http://kempumps.com/fluidends, 2013, last accessed: Aug. 21, 2020, 6 pages.
Vulcan Industrial, "Vulcan," http://www.vulcanindustrial.com/, 2019, last accessed: Aug. 21, 2020, 3 pages.
Vulcan Industrial, "Vulcan," http://www.vulcanindustrial.com/fluid-ends/, 2019, last accessed: Aug. 21, 2020, 3 pages.
Covert Manufacturing, Inc., "Fluid End Block: Covert Manufacturing", (site visited Jul. 30, 2021), covertmfg.com, URL: <http://www.covertmfg.com/our-capabilities/fluid-end-block/> (Year: 2021).
Kerr Pumps, "the most advanced fluid ends", (site visited Aug. 5, 2021), Kerrpumps.com, URL: <http://kempumps.com/fluidends> (Year: 2021).
Shandong Baorun, 2250 Triplex Plunger Pump Fluid End Exchangeable with Spm, (site visited Aug. 5, 2021), made-in-china.com, URL: <https://sdbaorun.en.made-in-china.com/product/wNixIDXYrshL/China-2250-Triplex-Plunger-Pump-Fluid-End-Exchangeable-with-Spm.html> (Year: 2021).
John Miller, "The Reciprocating Pump, Theory, Design and Use," 1995, 2nd Edition, Krieger Publishing Company, Malabar, Florida, 1 page.
"QIH-1000 HP Quintuplex," Dixie Iron Works, 2017, https://web.archive.org/web/20171031221150/http:/www.diwmsi.com/pumping/qi-1000/.
Technical Manual MSI Hybrid Well Service Pump Triplex and Quintuplex Models, Dixie Iron Works, Mar. 12, 2019, 88 pages. https://www.diwmsi.com/pumping/qi-1000/.
Carpenter, "CarTech Ferrium C61 Data Sheet," 2015, 2 pages.
The American Heritage Dictionary, Second College Edition, 1982, 6 pages.
Matthew Bultman, "Judge in West Texas Patent Hot Spot Issues Revised Guidelines," Sep. 23, 2020, Bloomberg Law News, 3 pages.
David L. Taylor, "Machine Trades Blueprint Reading: Second Edition," 2005, 3 pages.
Blume, U.S. Pat. No. 6,544,012, issued Apr. 8, 2003, Fig. 12A.
Caterpillar, "Cat Fluid Ends For Well Stimulation Pumps," 2015, 2 pages.
Claim Chart for U.S. Pat. No. 6,544,012, 23 pages.
Claim Chart for U.S. Pat. No. 7,186,097, 22 pages.
Claim Chart for U.S. Pat. No. 7,845,413, 8 pages.
Claim Chart for U.S. Pat. No. 9,534,472, 8 pages.
Claim Chart for U.S. Pat. Pub. No. 2013/0319220, 17 pages.
Claim Chart for U.S. Pat. Pub. No. 2014/0348677, 10 pages.
Claim Chart for U.S. Pat. Pub. No. 2015/0132157, 23 pages.
Claim Chart for "GD-3000," 9 pages.
Claim Chart for "NOV-267Q," 14 pages.
Collins English Dictionary, "annular," https://www.collinsdictionary.com/us/dictionary/english/annular, 2021, 4 pages.
Collins English Dictionary, "circumference," https://www.collinsdictionary.com/us/dictionary/english/circumference, 2021, 7 pages.

(56) References Cited

OTHER PUBLICATIONS

Collins English Dictionary, "plug," https://www.collinsdictionary.com/us/dictionary/english/plug, 2021, 17 pages.
Collins English Dictionary, "profile," https://www.collinsdictionary.com/us/dictionary/english/profile, 2021, 10 pages.
Collins English Dictionary, "sleeve," "therethrough," "through," "tube," and "tubular," 8 pages.
Collins English Dictionary, "space," https://www.collinsdictionary.com/us/dictionary/english/space, 2021, 13 pages.
Collins English Dictionary, "stairstep," https://www.collinsdictionary.com/us/dictionary/english/stairstep, 2021, 3 pages.
Congressional Record—Extensions of Remarks, Apr. 18, 2007, pp. E773-E775.
Congressional Record, Mar. 7, 2011, 31 pages.
"Declaration of Steven M. Tipton, Ph.D., P.E., Submitted with Patent Owner's Preliminary Response," Sep. 11, 2020, 155 pages.
"Declaration of William D. Marscher, P.E.—U.S. Pat. No. 10,914,171," Feb. 11, 2021, 308 pages.
"Declaration of William D. Marscher, P.E.—U.S. Pat. No. 10,591,070," May 25, 2020, 209 pages.
Email dated Sep. 22, 2020 in PGR2020-00065, 3 pages.
Email dated Sep. 25, 2020 in *Kerr Machine* v *Vulcan Industrial Holdings*, 1 page.
U.S. Pat. No. 10,288,178, 353 pages.
U.S. Pat. No. 10,519,950, 142 pages.
U.S. Pat. No. 10,591,070, 168 pages.
U.S. Appl. No. 16/722,139, 104 pages.
U.S. Appl. No. 13/773,271, 250 pages.
U.S. Appl. No. 15/719,124, 183 pages
U.S. Appl. No. 16/814,267, 194 pages.
U.S. Appl. No. 17/120,121, 110 pages.
U.S. Appl. No. 62/234,483, 45 pages.
U.S. Appl. No. 62/315,343, 41 pages.
U.S. Appl. No. 62/318,542, 44 pages.
U.S. Appl. No. 62/346,915, 41 pages.
U.S. Appl. No. 62/379,462, 24 pages.
"Flush Free Sealing Benefits," Oct. 3, 2011, http://empoweringpumps.com/flush-free-sealing-benefits/, accessed May 9, 2020, 5 pages.
Gardner Denver, Well Servicing Pump Model GD-3000—Operating and Service Manual, Apr. 2011, 44 pages.
Gardner Denver, Well Servicing Pump Model GD-1000Q—Fluid End Parts List, Sep. 2011, 24 pages.
Gardner Denver, Well Servicing Pump Model HD-2250—Operating and Service Manual, Jan. 2005, 44 pages.
Gardner Denver, Gd 2500Q Hdf Frac & Well Service Pump, 2 pages.
Cutting Tool Engineering, "Groove milling," Aug. 1, 2012, https://www.ctemag.cojm/news/articles/groove-milling, accessed May 13, 2020, 11 pages.
Vargususa, "Groovex Innovative Grooving Solutions—Groove Milling," Dec. 12, 2011, http://www.youtube.com/ watch?v=vrFxHJUXjvk, 68 pages.
Kerr Pumps, Kerr KA-3500B/KA-3500BCB Plunger Pump Parts and Service Manual, 41 pages.
Kerr Pumps, Kerr KD-1250B/KD-1250BCB Plunger Pump Service Manual, 38 pages.
Kerr Pumps, Kerr KJ-2250B and KJ-2250BCB Plunger Pump Service Manual, 38 pages.
Kerr Pumps, Kerr KM-3250B / KM-3250BCB Plunger Pump Service Manual, 35 pages.
Kerr Pumps, Kerr KP-3300B / KP-3300BCB Plunger Pump Service Manual, 41 pages.
Kerr Pumps, Kerr KT-3350B/BCB KT-3400BCB Plunger Pump Service Manual, 46 pages.
Kerr Pumps, Kerr triplex pump km3250bcb 10,000 psi @ 5.1 gmp, Feb. 2, 2021, http://imged.com/kerr-triplex-pump-km3250bcb-10-000-psi-5-1-gmp-8234739.html, 2 pages.

Lex Machina, 77 Federal district court cases for Alan D Albright of W.D. Tex., http://law.lexmachina.com/court/txwd/judge/5198506/cases?status=open&filed_on-from=2020-02-19&filed_on-to=2020-04-19&pending-, 7 pages.
Lex Machina, Motion Metrics Report for 834 orders issued by District Judge Alan D Albright (ADA) in 1,603 cases from the Search for federal district court cases before Judge Alan D Albright, https://law.lexmachina.com/motions/motion_metrics?cases_key=yyix9Y8-k2k, generated on Sep. 23, 2020, 1 page.
Lex Machina, 6:20-cv-00200-ADA, *Kerr Machine Co.* v. *Vulcan Industrial Holdings, LLC Docket Entries*, https://law.lexmachina.com/cases/2004206451#docket-entries, 6 pages.
Jonathan Maes, "Machining Square Inside Corners: Conquer the Nightmare!," accessed Sep. 8, 2020, https://makeitfrommetal.com/machining-square-inside-corners-the-night . . . , 22 pages.
Ross Mackay, "Process Engineering: Properly seal that pump," May 17, 2005, https://www.chemicalprocessing.com/articles/2005/465, 11 pages.
MSI Fluid End Components, https://www.scribd.com/document/421304589/Fluid-End, 1 page.
MSI Dixie Iron Works, Ltd., MSI QI-1000 Technical Manual for 1000 HP Quintuplex MSI QI-1000 Pump, Feb. 21, 2004, 90 pages.
MSI, Product Listing and Pricing, accessed Mar. 8, 2016, 19 pages.
National Oilwell Varco, 267Q-6M Quintuplex Plunger Pump: Parts List, Jul. 21, 2008, 13 pages.
Oil and Gas Well Servicing, Audit Procedures for Oil and Gas Well Servicing, May 2010, Texas Comptroller of Public Accounts, Audit Division, 68 pages.
Tony Atkins and Marcel Escudier, Oxford Dictionary of Mechanical Engineering. Oxford University Press, 2013, 10 pages.
Parker Hannifin Corporation and Autoclave Engineers, Technical Information, 2016, 16 pages.
Girdhar, Moniz and Mackay, "Chapter 5.4 Centrifugal pump design," Plant and Process Engineering 360, 2010, pp. 519-536.
Parker Hannifin Corporation, PolyPak Seals for Hydraulic Applications Catalog EPS 5370_PolyPak, 2015, 38 pages.
Paresh Girdhar and Octo Moniz, "Practical Centrifugal Pumps—Design. Operation and Maintenance," Newnes, 2005, 33 pages.
Reinhard Preiss, "Stress concentration factors of flat end to cylindrical shell connection with a fillet or stress relief groove subjected to internal pressure," 1997, Int. J. Pres. Ves. & Piping, vol. 73, pp. 183-190.
Caterpillar, WS255 Quintuplex Well Stimulation Pump, 2 pages.
Gardner Denver Pumps, Redline Series Brochure, 3 pages.
Eaton Aerospace Group, Resilient Metallic Seals, TF100-35D, Oct. 2013, 60 pages.
Scott McKeown, "District Court Trial Dates Tend to Slip After PTAB Discretionary Denials—Patents Post-Grant," Jul. 24, 2020, Ropes & Gray, accessed Sep. 23, 2020, 3 pages.
Ricky Smith and R. Keith Mobley, "Rules of Thumb for Maintenance and Reliability Engineers—Chapter 14: Packing and Seals," Elsevier, 2008, pp. 239-250.
Schlumberger, Jet Manual 02—Reciprocating Pumps, Aug. 7, 2015, 63 pages.
Schlumberger, Treating Equipment Manual: Fluid Ends, Section 10, Apr. 2000, 87 pages.
SPM Oil & Gas, SPM QEM 3000 Frac Pump, 2021, 4 pages.
Supplemental Declaration of Steven M. Tipton, Ph.D., P.E.—Case PGR2020-00065, U.S. Pat. No. 10,591,070, Mar. 2, 2021, 35 pages.
Servagroup, TPD 600 Triplex Pump Brochure, Mar. 24, 2011, 2 pages.
Utex Industries, Inc., Well Service Products Catalog, Jun. 2017, 51 pages.
Utex Industries, Inc., Well Service Packing—Packing Assemblies Complete & Replacement, May 2013, 40 pages.
Vargus Ltd., Groove Milling High Precision Tools for Groove Milling, Dec. 2012, pp. 2-22.

* cited by examiner

CONNECTING ROD ASSEMBLY FOR RECIPROCATING PUMP

CROSS REFERENCE TO RELATED APPLICATIONS

This application claims the benefit of U.S. Provisional Patent Application No. 63/071,137, filed on Aug. 27, 2020, titled "CONNECTING ROD ASSEMBLY FOR RECIPROCATING PUMP," the full disclosure of which is hereby incorporated herein in its entirety by reference.

TECHNICAL FIELD

Embodiments of the subject matter disclosed herein generally relate to pump systems, and in particular to connecting rod and crosshead assemblies.

BACKGROUND

Pumping systems may be used in a variety of applications, such as industrial applications where pumping systems are used to elevate a working fluid pressure. One such application is hydraulic fracturing systems, where high pressure pumps are used to increase a fluid pressure of a working fluid (e.g., fracturing fluid, slurry, etc.) for injection into an underground formation. The working fluid may include particulates, which are injected into fissures of the formation. When the fluid is removed from the formation, the particulates remain and "prop" open the fissures, facilitating flow of oil and gas. In many applications, reciprocating pumps are used where a fluid is introduced into a fluid end inlet passage and out through an outlet passage. A plunger reciprocates within a bore to add energy to the fluid. The plunger may be coupled to a powered crankshaft that provides energy via a connecting rod. The connecting rod is coupled to the plunger via a crosshead. The end connection at the crosshead typically has a bushing located within the crosshead. However, loading at the bushing may be uneven.

SUMMARY

Applicant recognized the problems noted above herein and conceived and developed embodiments of systems and methods, according to the present disclosure, for crosshead assemblies.

In accordance with one or more embodiments, a connecting rod assembly includes a crosshead for coupling a connecting rod to a plunger, the crosshead having a hole extending through the crosshead. The connecting rod assembly also includes a knuckle cage positioned within the crosshead, the knuckle cage extending through the hole and including a cutout to provide access to a passage formed in the knuckle cage. The connecting rod assembly further includes a knuckle positioned within the passage of the knuckle cage, the knuckle having a mounting surface that is substantially planar, the mounting surface coupling to the connecting rod at a mating end with a substantially planar mating end surface.

In accordance with another embodiment, a connecting rod assembly includes a crosshead having an interior portion, a hole extending from a first end to a second end, and a pair of platforms on opposite first and second sides of the hole. The connecting rod assembly also includes a knuckle cage positioned within the hole and extending from the first end to the second end, a cage axis being substantially perpendicular to the pair of platforms, and a recess formed in the knuckle cage extending through a body portion of the knuckle cage to provide access to a pivot surface of the knuckle cage from a direction perpendicular to the cage axis, the pivot surface forming at least a portion of a cage passage extending along the cage axis. The connecting rod assembly further includes a knuckle positioned within the cage passage, the knuckle being axially aligned with the cage axis such that the knuckle, responsive to a force, rotates about the cage passage, the knuckle having a planar mating surface positioned to align with the recess formed in the knuckle cage.

In accordance with another embodiment, a method includes positioning a knuckle cage within a crosshead. The method also includes positioning a knuckle within the knuckle cage. The method further includes aligning a mating end of a connecting rod with a mounting surface of the knuckle. The method also includes coupling the connecting rod to the knuckle.

BRIEF DESCRIPTION OF THE DRAWINGS

The present technology will be better understood on reading the following detailed description of non-limiting embodiments thereof, and on examining the accompanying drawings, in which.

DETAILED DESCRIPTION

Figure 1:
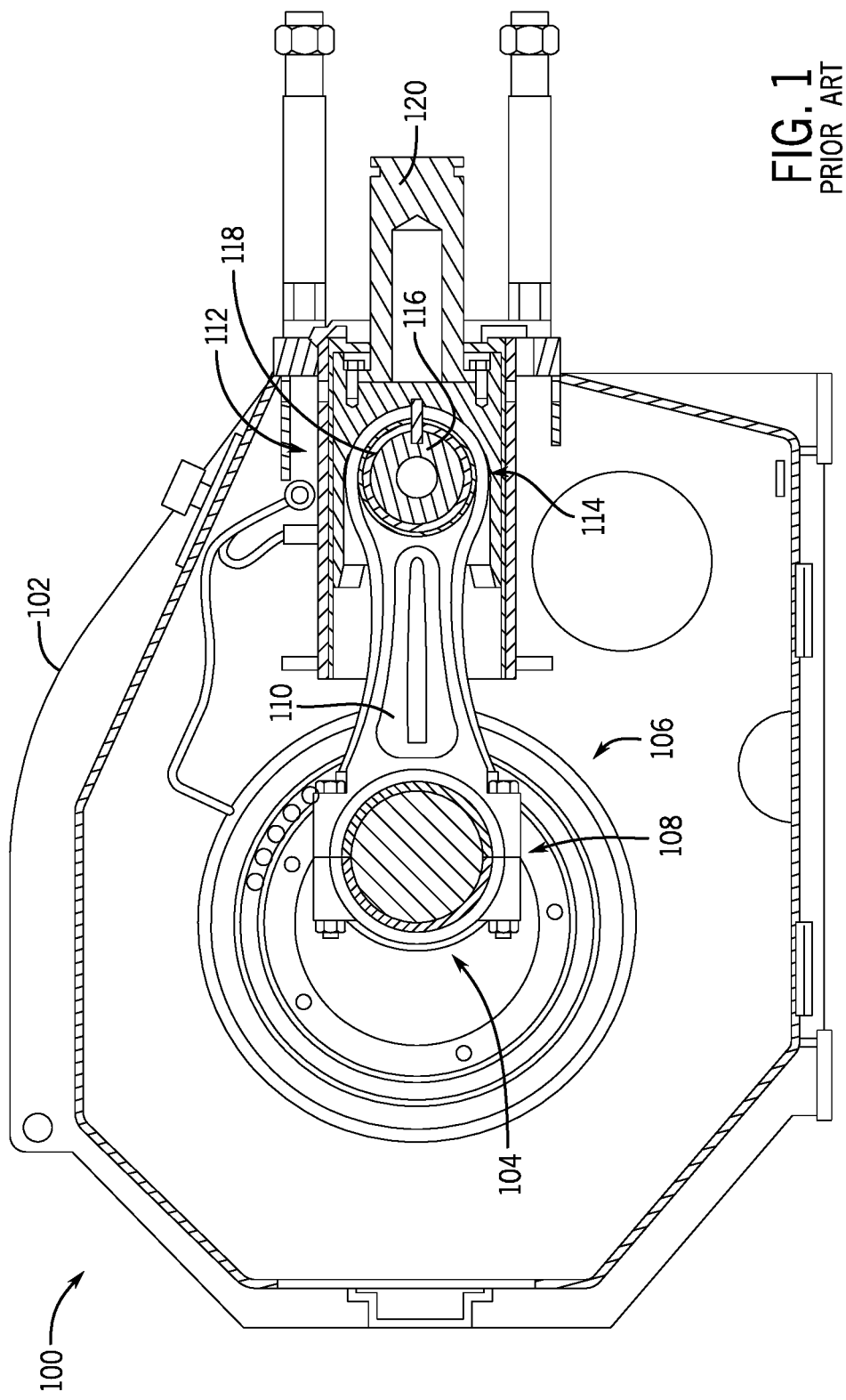
FIG. 1 is a schematic cross-sectional view of a prior art pump assembly.

The foregoing aspects, features, and advantages of the present disclosure will be further appreciated when considered with reference to the following description of embodiments and accompanying drawings. In describing the embodiments of the disclosure illustrated in the appended drawings, specific terminology will be used for the sake of clarity. However, the disclosure is not intended to be limited to the specific terms used, and it is to be understood that each specific term includes equivalents that operate in a similar manner to accomplish a similar purpose.

When introducing elements of various embodiments of the present disclosure, the articles "a", "an", "the", and "said" are intended to mean that there are one or more of the elements. The terms "comprising", "including", and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments", or "other embodiments" of the present disclosure are not intended to be interpreted as excluding the existence of additional embodiments that also incorporate the recited features. Furthermore, reference to terms such as "above", "below", "upper", "lower", "side", "front", "back", or other terms regarding orientation or direction are made with reference to the illustrated embodiments and are not intended to be limiting or exclude other orientations or directions. Additionally, like reference numerals may be used for like components, but such use is for convenience purposes and not intended to limit the scope of the present disclosure. Moreover, use of terms such as substantially or approximately may refer to +/−10 percent.

Embodiments of the present disclosure are directed toward a connecting rod assembly for coupling a plunger for a pump (e.g., a reciprocating pump) to a power end. As will be described herein, multiple configurations may include knuckles and knuckle cages, arranged within a crosshead, to enable different mounting configurations between the crosshead and the connecting rod.

In embodiments, the crosshead is loaded with a knuckle cage, which is then prevented from rotating by one or more keys, such as a pair of locking washers, among other options. The retention may or may not also include a feature to prevent axial motion of the knuckle cage relative to the cross-bored hole of the crosshead. The knuckle is then inserted from the side of the crosshead into the knuckle cage and orientated such that a flat section is pointed to a rear of the crosshead. The connecting rod is then attached to knuckle with a pair of axially aligned fasteners that may not experience any bending or shear loading due to their configuration. There may also be additional alignment pins, keys, or bosses in various embodiments.

Various embodiments may also include the connecting rod assembly where the knuckle and connecting rod are attached via fasteners/pins/keys that are slid through the side of the parts. This could also include features such as a T-slot or dovetail.

As will be described herein, a reciprocating pump assembly has a pump within a housing. The pump has a crankshaft that rotates and a crosshead that is connected to a plunger via a pony rod. The plunger pumps fluid through cylinders in the pump. A connecting rod connects at one end to the crankshaft and at another end to the crosshead to translate the rotational motion of the crankshaft into linear movement of the crosshead, which is translated to the plunger. The end connected to the crosshead is secured to the crosshead traditionally by a bushing located within the crosshead that allows the connecting rod end to pivot during operation. Embodiments of the present disclosure include an independent knuckle piece to make the assembly. The knuckle may be a smaller part that may be hardened independently of the connecting rod casting. The knuckle may be attached via pins and fasteners to the connecting rod such that it provides the pivot point of the assembly against a bearing. The interface between the knuckle pin and the connecting rod may be a flat-to-flat surface where the loading is distributed evenly, in various embodiments.

Embodiments of the present disclosure provide for a distinct coupling between the connecting rod and the crosshead. As will be described, the traditional pin connection is removed, which moves expensive heat treating and carburizing processes into a single smaller component, where the need for additional machining post hardening would not be necessary. Additionally, the number of load bearing components is significantly reduced from a typical assembly. Accordingly, embodiments may be directed toward a flat-to-flat knuckle pin and connecting rod interface and side assembly, rather than a traditional axial assembly.

FIG. 1 is a schematic cross-sectional view of an embodiment of a pump assembly 100, which may also be referred to as a reciprocating pump assembly and/or a reciprocating pump. The pump assembly 100 may be utilized during hydraulic fracturing operations, among other operations, where a working fluid (e.g., fracturing fluid, slurry, etc.) is introduced into the fluid end and energy is added to the working fluid to increase a pressure of the working fluid. Fracturing fluid, by way of example only, may include corrosives and also particulates, such as sand or ceramics, which are utilized during fracturing operations.

The illustrated pump assembly 100 includes a frame or housing 102 that contains a powered crankshaft 104 that rotates about an axis (not pictured, but perpendicular to the plane of the page). It should be appreciated that various components have been removed for clarity and conciseness. The crankshaft 104 illustrated in FIG. 1 is coupled to a connecting rod 106 at a first end 108. The connecting rod 106 includes a body 110 that extends laterally away from the powered crankshaft 104 and into a crosshead 112. A second end 114 of the connecting rod 106 is positioned within the crosshead 112 and may be coupled via a pin 116 that extends through a bearing 118 positioned through the second end 114. The crosshead 112 is further coupled to a pony rod 120 that transmits energy from the powered crankshaft 104 into a plunger (not pictured). In operation, rotational movement of the powered crankshaft 104 is transferred to the connecting rod 106, which may pivot about the bearing 118 within the crosshead 112 to translate force from the powered crankshaft 104 into axial movement applied to the plunger (not pictured).

Figure 2:
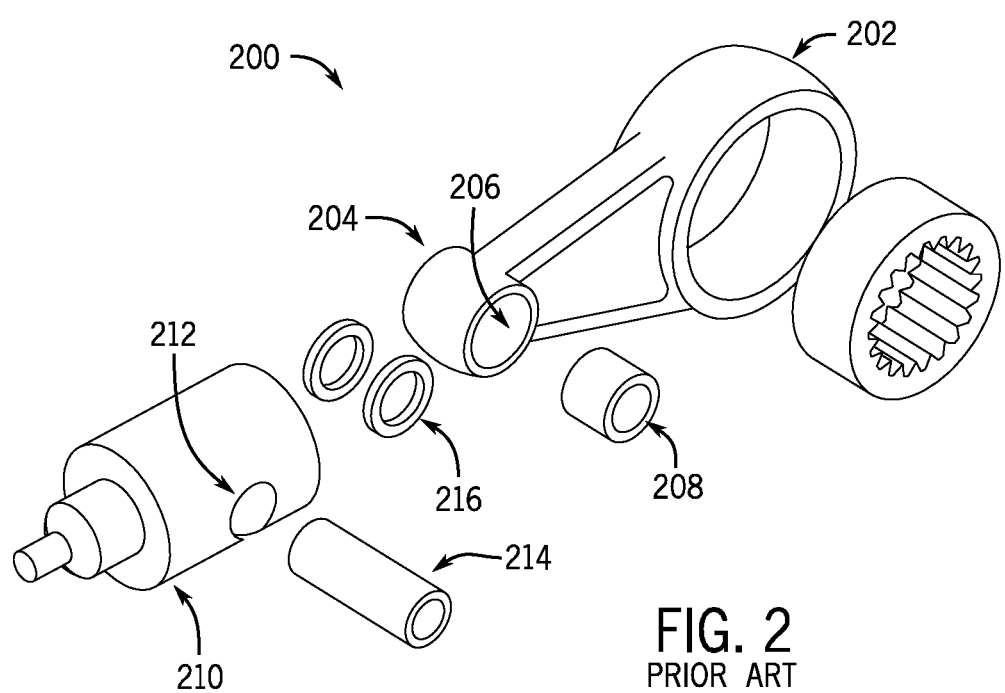
FIG. 2 is an isometric view of a prior art connecting rod assembly.

FIG. 2 is a perspective exploded view of a prior art connecting rod assembly 200. A connecting rod 202 is illustrated with an end 204 and an opening 206 that receives a journal bearing 208. The end 204 is installed within a crosshead 210 such that a radial hole 212 of the crosshead 210 aligns with the journal bearing 208. A pin 214 may extend through the radial hole 212 and the journal bearing 208, with bushings 216 positioned on the outside of the pin 214. Accordingly, loading may be either entirely through the connecting rod 202 and into the crosshead 210 and/or through the connecting rod 202, journal bearing 208, pin 214, and bushings 216. Embodiments of the present disclosure may overcome the problems associated with this traditional configuration, which may lead to expensive treatment of various components to resist wear from loading.

It should be appreciated that alternative mounting configurations than those shown in FIG. 2 may also be used that have similar drawbacks. For example, a rounded interface between the crosshead pin and crosshead, for example where a fastener may be used to secure the pin, may present alignment problems. Additionally, shear loading may be applied during a retract stroke. Moreover, such a configuration provides a small area on the pin/crosshead interface, which could lead to assembly difficulties, among other problems. Embodiments of the present disclosure address and overcome these problems.

Figure 3:
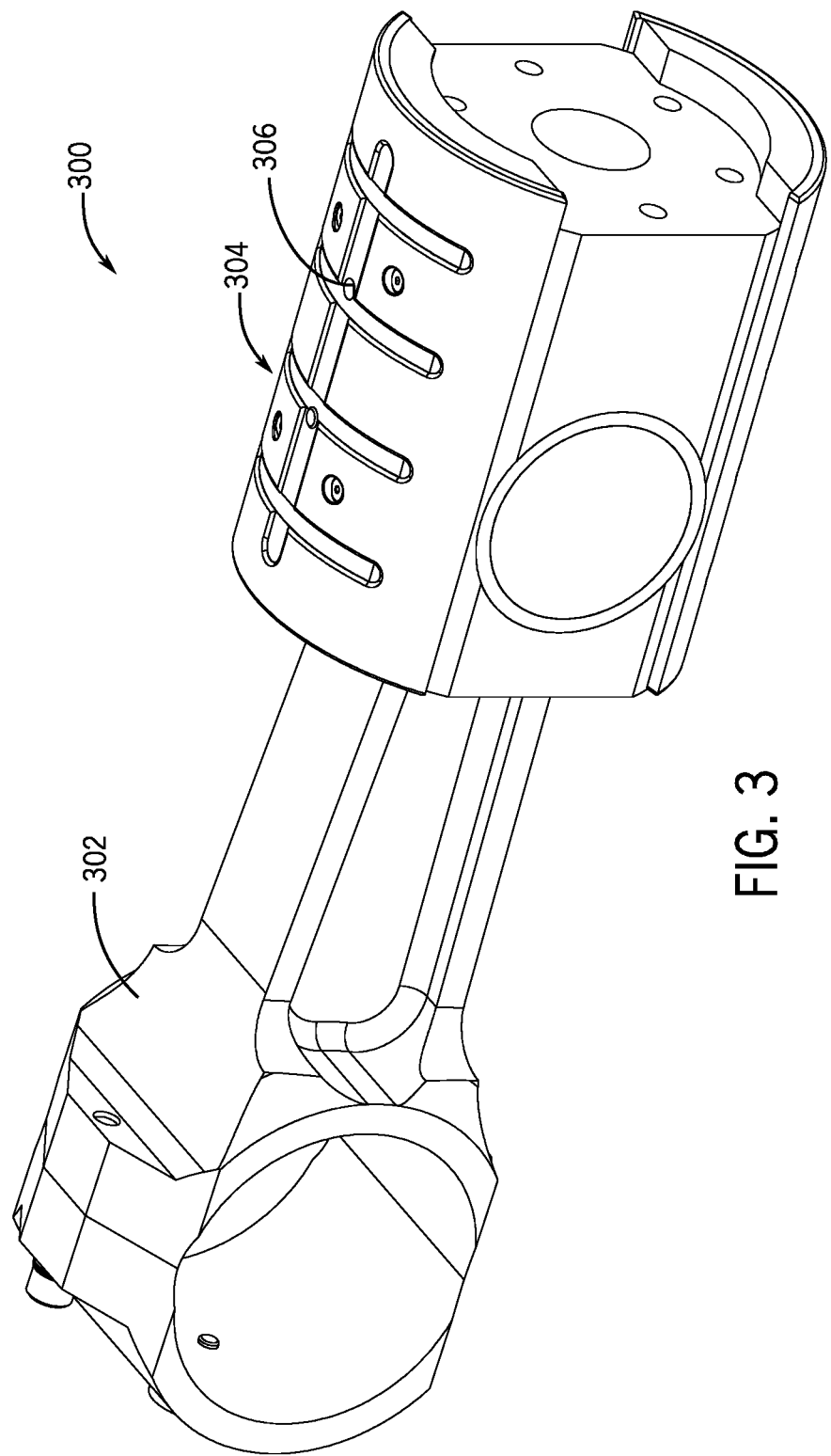
FIG. 3 is an isometric view of an embodiment of an assembled configuration of a connecting rod and crosshead, in accordance with embodiments of the present disclosure.

FIG. 3 is an isometric view of an embodiment of an assembled configuration 300 including a connecting rod 302 and a crosshead 304. As will be described below, embodiments may include a removable knuckle and knuckle cage within the crosshead 304 to facilitate improved coupling between the components. For example, the knuckle may enable a flat-to-flat mounting configuration with the connecting rod 302. Additionally, in various embodiments, coupling between the knuckle and the connecting rod 302 may be axial (e.g., via axial fasteners) to reduce loading, such as shear loads, on the fasteners. Furthermore, various other coupling methods such as radial pins, J-slots, T-slots, dovetails, and the like may also be utilized with embodiments of the present disclosure. Moreover, one or more apertures 306 may be utilized to provide lubrication to interior components, thereby providing a hydrodynamic cushion to the knuckle and/or a knuckle cage and crosshead.

Figure 4:
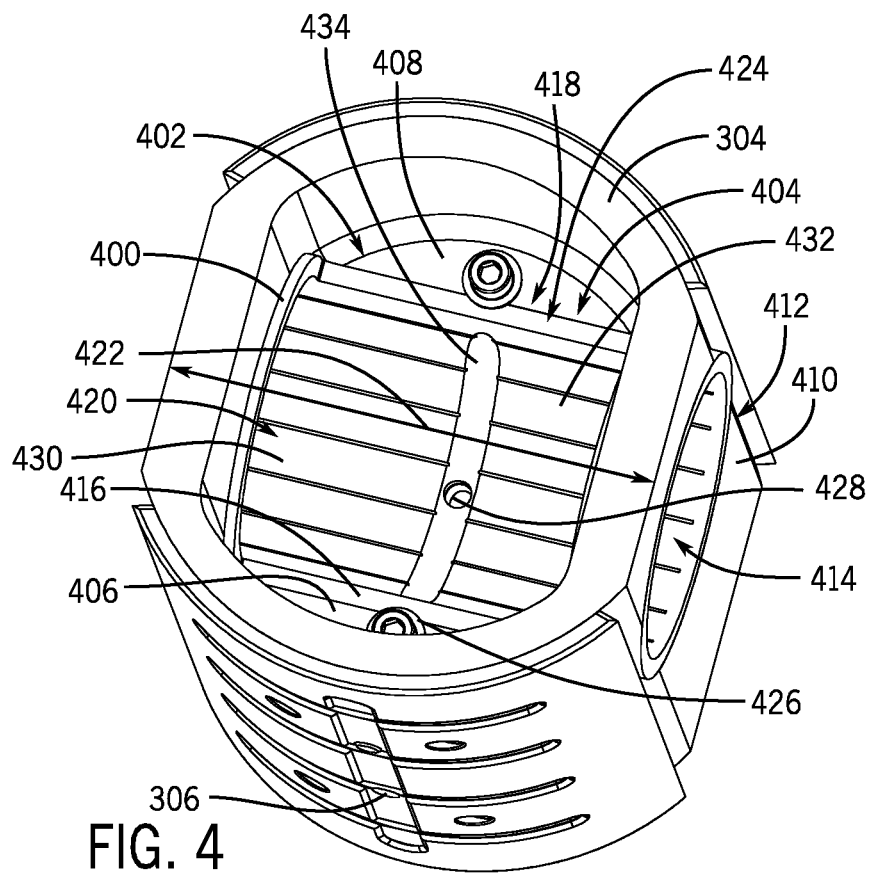
FIG. 4 is an isometric view of an embodiment of a crosshead with a knuckle cage, in accordance with embodiments of the present disclosure.

FIG. 4 is an isometric view of an embodiment of the crosshead 304 including a knuckle cage 400. In this example, the crosshead 304 includes an interior portion 402 having a slot 404 that receives the knuckle cage 400. The slot 404 is arranged between a first end 406 and a second end 408 of a body portion 410 of the crosshead 304, which may act as a platform, as will be described herein. In other words, the slot 404 is recessed within the body portion 410 and/or may be represented as an indentation or a recessed area, thereby forming an area to receive the knuckle cage 400.

The crosshead 304 further includes a radial hole 412. In this example, the radial hole 412 is substantially aligned with the knuckle cage 400 and in operation the knuckle cage 400 may be installed through the radial hole 412. Further illustrated is the aperture 306, which may be utilized to provide fluids, such as lubrication, to the interior portion 402 of the crosshead 304. For example, one or more flow passages (not pictured) may be cross drilled and/or routed within the body portion 410 to provide lubrication to predetermined locations.

Returning to the knuckle cage 400, a cage hole 414 extends through a knuckle body 416 and is aligned with the radial hole 412. In operation, a knuckle, described below, may extend through both the cage hole 414 and the radial hole 412, which may eliminate the pins described above with respect to prior art configurations. The illustrated knuckle cage 400 further includes a cut out 418, which removes a portion of the knuckle body 416 to provide access to a passage 420 formed by the knuckle hole 414. In this example, the cut out 418 is substantially rectangular, but it should be appreciated that other shapes may be utilized for the cut out 418. In one or more embodiments, the cut out 418 may be considered as a material portion removed from a tubular or cylindrical component to provide access to an interior portion of the tubular or cylindrical component while still maintaining the general shape. In the embodiment of FIG. 4, the cut out 418 does not extend along an entire length 422 of the knuckle cage 400. It should be appreciated that the cut out 418 may extend along the length 422 and that, in other embodiments, one or more additional closure features may be utilized to block access to the interior portion 402 in the absence of the knuckle body 416. For example, in one or more embodiments, the cut out 418 may extend along the entire length 422 and the body portion 410 may include one or more features along the interior portion to block or otherwise restrict movement of components extending through the knuckle cage 400. In other words, portions of knuckle cage 400 illustrated proximate the cage hole 414 may be removed and replaced with one or more inserts or portions coupled to the body portion 410.

In this example, the knuckle cage 400 further includes recesses 424 formed at opposite ends that facilitate securing the knuckle cage 400 to the crosshead 304. In this example, lock washers 426 are secured to the inner portion 402 (e.g., at the ends 406, 408 on the platform portion) and overlap, at least partially, the recesses 424, thereby blocking movement of the knuckle cage 400. In various embodiments, movement of the knuckle cage 400 is blocked in multiple directions. For example, movement along the passage 420 is blocked by contacting the body 416 on each side of the recess. Furthermore, upward movement (e.g., perpendicular to the passage 420) is blocked by both the overlap at the radial hole 412 and by the lock washers 426. It should be appreciated that the recesses 424 are shown for illustrative purposes as one embodiment for securing the knuckle cage 400 within the crosshead 304. In various other embodiments, the recesses 424 may be omitted in favor other methods for securing the knuckle cage 400, such as fasteners, press fittings, locking components, and the like. Furthermore, in at least one embodiment, the recesses 424 may have a shorter lateral length such that the recesses 424 do not extend substantially across the length 422. That is, the recesses 424 may have an opening or width particularly selected to receive one or more fasteners, such as the lock washers 426, to further block movement along the passage 420. Furthermore, in certain embodiments, the lock washers 426 may be applied along the cutout 418 without the recesses 424.

The illustrated example further includes a fluid passage 428 formed in the knuckle body 416 at the passage 420. That is, the fluid passage 428 enables fluid flow into the passage 420. In various embodiments, the fluid passage 428 may be described as being arranged substantially perpendicular to the cage hole 414. As noted above, fluids such as lubrication may be directed via the apertures 306 and into the inner portion 402, for example to provide lubrication along a pivot surface formed within the passage 420. It should be appreciated that there may be more than one fluid passage 428 and that the fluid passages 428 may be particularly arranged at different locations.

In operation, a knuckle is installed within the passage 420 and may pivot about an axis, responsive to movement of the connecting arm. The illustrated knuckle cage 400 includes a pivot surface 430 along the passage 420, which may be machined or otherwise prepared for contact with the knuckle. As will be described, lubricating fluids may form a hydrodynamic cushion between the knuckle cage 400 and the knuckle. In various embodiments, the knuckle cage 400 may be formed or prepared to resist shock or other damages, for example by hardening or various other surface preparation methods. In the illustrated embodiment, the pivot surface 430 includes grooves or cutouts. In this example, both axial grooves 432 and lateral grooves 434 are illustrated, but it should be appreciated that the pivot surface 430 may be substantially smooth or may include more or fewer grooves 432, 434. In one or more embodiments, the grooves 432, 434 may receive lubricating fluid, which may reduce friction and provide additional hydrodynamic cushion to one or more components. In at least one embodiment, the grooves 432, 434 may be adjusted based upon the supplied lubrication. That is, the grooves 432, 434 may be longer/shorter, wider/thinner, deeper/shallower, and/or the like based, at least in part, on properties of the supplied lubrication.

Figure 5:
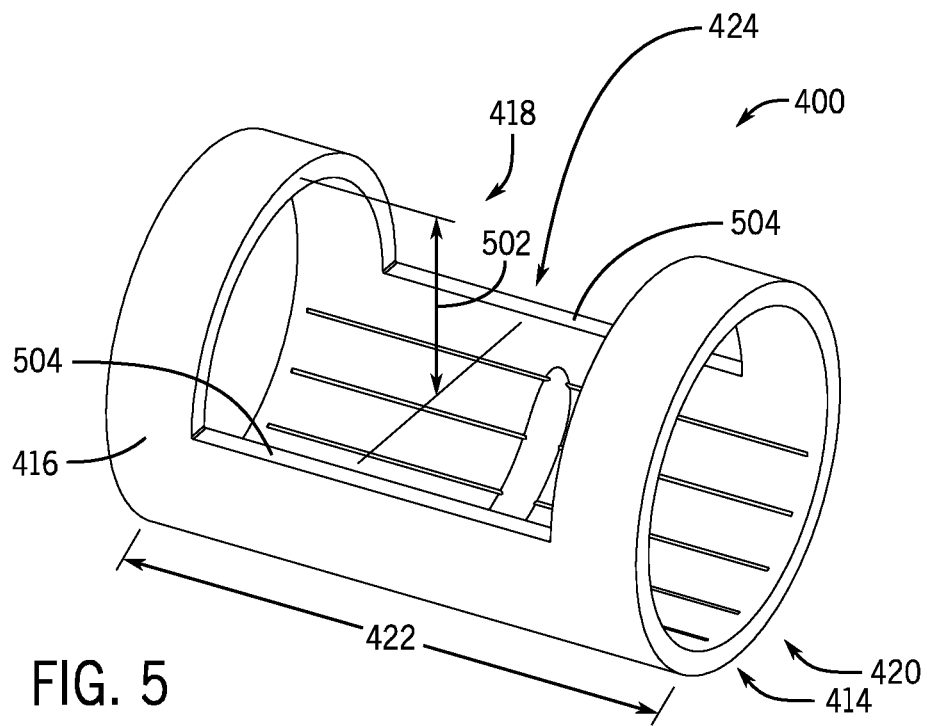
FIG. 5 is an isometric view of an embodiment of a knuckle cage, in accordance with embodiments of the present disclosure.

FIG. 5 is an isometric view of the knuckle cage 400. As noted above, the knuckle body 416 is substantially cylindrical and includes the passage 420 extending therethrough and cage holes 414 at each end. Further illustrated is the cut out 418 providing access to the passage 420. This example also includes a rectangular cut out 418, but it should be appreciated that other shapes may be utilized. As noted above, the cut out 418 does not extend the length 422 in this example, thereby leaving portions of the body 416 at each end. However, other embodiments may include cut outs 418 that extend the length 422. For example, in at least one embodiment, the portions of the body 416 may include one or more slots of passages coupled to the cut out 418, which may extend the cut out 418 along the length 422.

The knuckle cage 400 also includes the recesses 424 described above, but which are illustrated as ends or substantially planar ends of the knuckle cage 400. As shown, the recesses 424 have a depth 502 (taken from a top of the knuckle cage 400). Barriers 504 are formed at each end of the recesses 424 via the cut out 418, which may block movement of the knuckle cage 400 when secured within the crosshead 304. That is, in one or more embodiments, lateral movement parallel to the passage 420 may be blocked due to engagement between the lock washers 426 (FIG. 4) and the barriers 504. It should be appreciated that the lock washers described above for this configuration are for illustrative purposes and that various other methods may be utilized to secure the knuckle cage 400 to the crosshead 304. For example, apertures may be formed to receive fasteners. Additionally, clamps or the like may be utilized. Furthermore, other secure fittings, such as J-hooks and the like may be incorporated into various embodiments. Additionally, in one or more embodiments, the body portion 410 (FIG. 4) may include one or more extensions that may engage the recesses 424, among other options.

Figure 6:
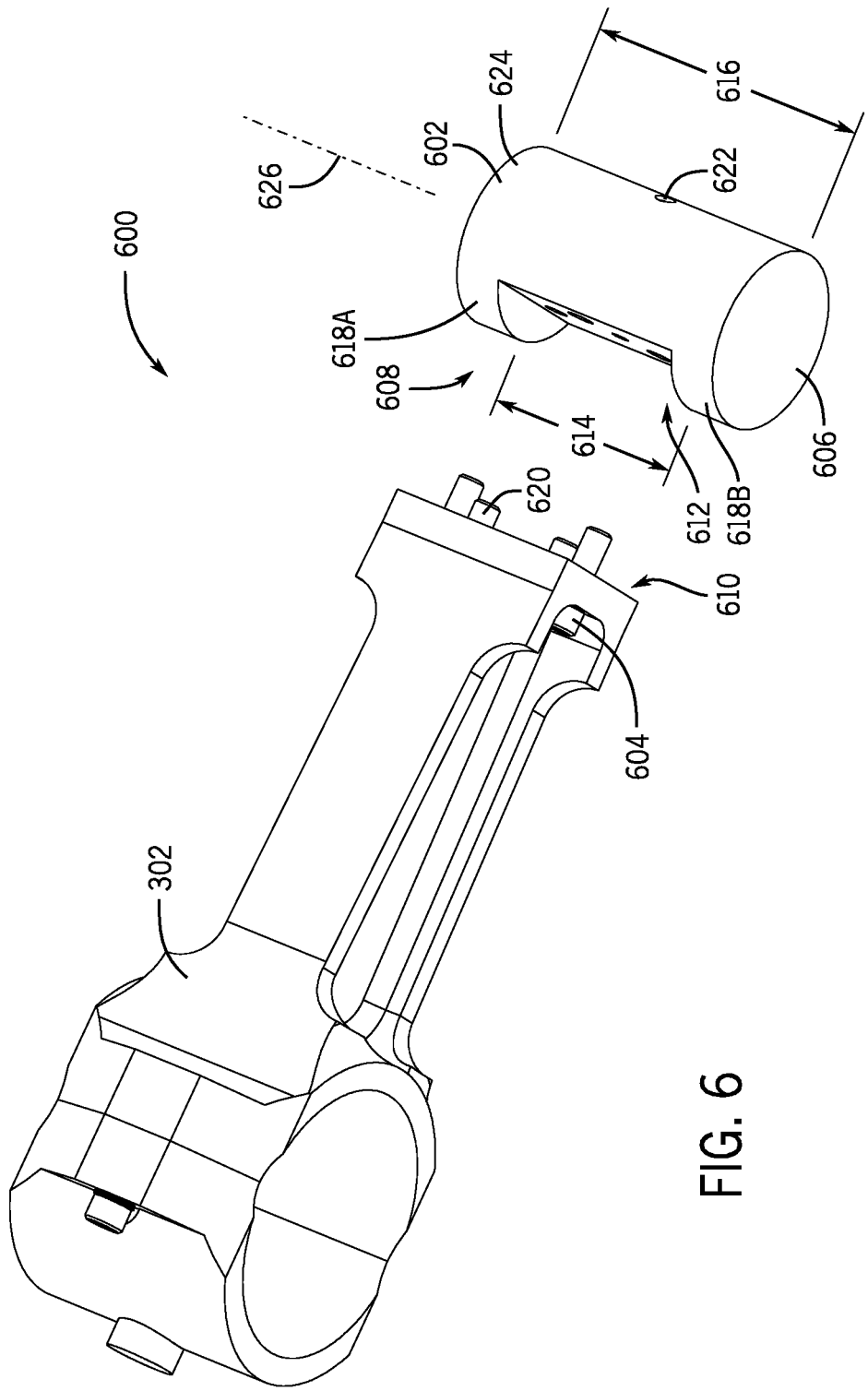
FIG. 6 is an isometric view of an embodiment of a connecting assembly, in accordance with embodiments of the present disclosure.

FIG. 6 is an isometric view of an embodiment of a connecting assembly 600 that includes the connecting rod 302 and a knuckle 602. In operation, the connecting rod 302 is secured to apertures (not shown) formed in the knuckle 602 via axial fasteners 604. In this example, the axial fasteners 604 are threaded fasteners, such as bolts, but it should be appreciated that other fasteners may be utilized in various embodiments. By way of example only, additional axial fasteners may include spring-loaded pins, rivets, cotter pins, clamps, and the like. Furthermore, it should be appreciated that the fasteners may extend through the knuckle 602 and engage apertures formed in the connecting rod 302. Accordingly, various different fastening configurations may be utilized within the scope of the present disclosure. For example, pinning from the side, dovetailing, and the like may be utilized to affix the connecting rod 302 to the knuckle 602. Accordingly, separation on the retract stroke is prevented.

In this example, the knuckle 602 includes a cylindrical body 606 that includes a knuckle recess 608 that receives a mating end 610 of the connecting rod 302. As shown, both the mating end 610 and a mounting surface 612 within the recess 608 are substantially flat (e.g., planar). As noted above, planar coupling surfaces may facilitate improved alignment for fastening and also force distribution, which may improve the reliability and longevity of the components.

The recess 608 extends for a recess length 614 that is less than a knuckle length 616. However, it should be appreciated that the recess 608 may also be substantially equal to the recess length 614. Accordingly, respective edges 618 (e.g., a first edge 618A and a second edge 618B) are formed at each end of the recess 608, which may be utilized to facilitate alignment of the mating end 610. Furthermore, the edges 618 may further restrict movement of the mating end 610. In other instances, the recesses length 614 may extend the length of the knuckle length 616. It should be appreciated that other elements may also be used, or be used in place of the edges 618, to facilitate alignment of the mating end 610 with the mounting surface 612. For example, pins 620 (e.g., dowel pins) may be installed in the mating end 610, the mounting surface 612, or both to facilitate alignment. For example, the illustrated pins 620 may engage holes or openings formed in the mating surface 612. The pins 620 may be used for alignment and also to restrict movement. Furthermore, in one or more embodiments, the mating end 610 may include extensions or edges to replace the edges 618 of the knuckle 602. By way of example, the knuckle 602 may include one or more slots to receive the extensions of the mating end 610 to facilitate alignment between the components.

In this example, the knuckle 602 includes a fluid aperture 622 that may facilitate supplying lubrication to one or more components within the crosshead 304, as described above. For example, the fluid aperture 622 may align with the aperture 306 and/or the fluid passage 428 to permit fluids, such as lubricants, into the inner portion 402 of the crosshead 304.

As will be described below, in operation the knuckle 602 may be installed within the passage 420 of the knuckle cage 400. An outer surface 624 of the knuckle 602 may rotate along the passage 420 about an axis 626. Such rotation may be supplied via movement of the connecting rod 302, which as noted above may be coupled to the powered crankshaft 104. Accordingly, the pivoting movement of the knuckle 602 within the knuckle cage 400 may facilitate translation of the rotational movement of the powered crankshaft 104 into axial movement of the plunger (not pictured), which is coupled to the crosshead 304 by the pony rod 120, as shown in FIG. 1.

Figure 7:
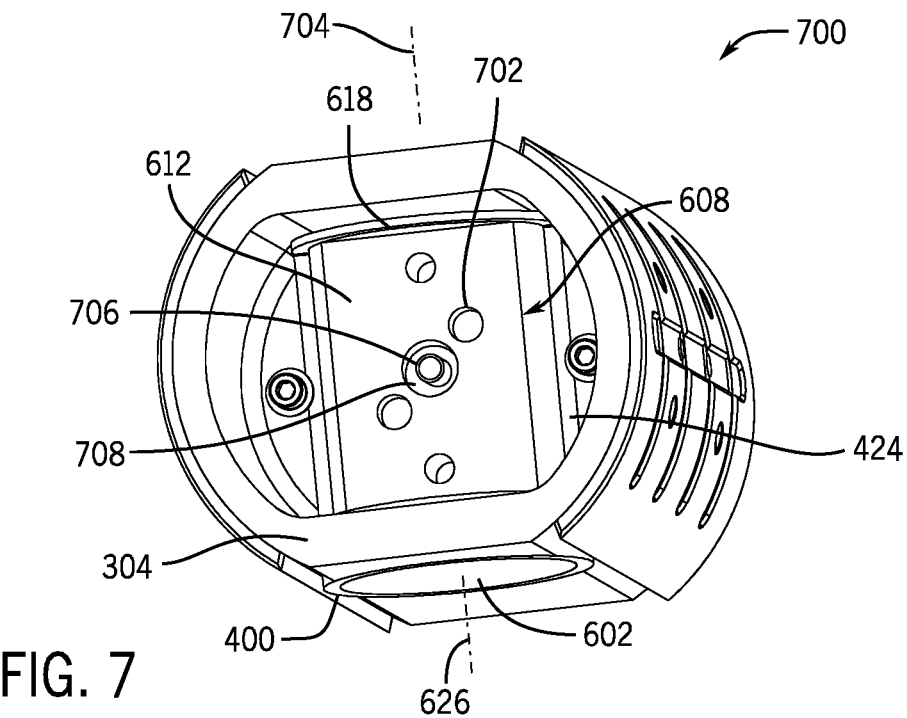
FIG. 7 is an isometric view of an embodiment of a crosshead assembly, in accordance with embodiments of the present disclosure.

FIG. 7 is an isometric view of an embodiment of a crosshead assembly 700 in which the knuckle 602 and the knuckle cage 400 are both installed within the crosshead 304. The connecting rod 302 has been omitted for clarity, but it should be appreciated that in operation the connecting rod 302 may couple to the illustrated mounting surface 612 via the mating end 610. As noted above, various features may be utilized to align and/or couple the connecting rod 302 to the mounting surface 612. For example, mating apertures 702 are illustrated along the planar mounting surface 612. It should be appreciated that the mating apertures 702 may include threads to facilitate coupling to the axial fasteners 604 or may be smooth holes for insertion of pins 620, among other mating options such as the above-described side pinning, dovetailing, and the like. Furthermore, it should be appreciated that the mating apertures 702 may be formed in the mating end 610 and that the fasteners and/or pins may extend through the knuckle 602. Additionally, the pattern of the apertures 702 is shown for illustrative purposes and any reasonable pattern or number of apertures 702 may be utilized.

As shown, the axis 626 of the knuckle 602 is aligned with an axis 704 of the passage 420. In other words, the knuckle 602 and the passage 420 are axially aligned within the interior portion 402 of the crosshead 304. As shown, the recess 608 in the knuckle 602 positions the mounting surface 612 substantially aligned with the locking recesses 424. However, it should be appreciated that the mounting platform 612 may be axially lower than or axially higher than the locking recesses 424. Furthermore, in this example, the edges 618 are within the ends of the knuckle cage 400. In other words, the recess 608 and cut out 418 substantially overlap to provide access to the mounting surface 612.

In operation, the connecting rod 302 is coupled to the mounting surface 612, which blocks movement of the knuckle 602 along the axis 626, effectively securing the knuckle 602 within the cage 400 and the crosshead 304. That is, locking the knuckle 602 within the cage 400 secures the knuckle 602 within the crosshead 304 via the lock washers 426 that secure the cage 400 to the crosshead 304. It should be appreciated that the knuckle 602 may still rotate about the axis 626, for example along the outer surface 624 (FIG. 6), which may be particularly selected and/or formed to facilitate the rotation while also reducing the likelihood of surface damage. Moreover, in various embodiments, the knuckle cage 400 may also be machined and/or formed from materials to reduce the likelihood of surface damage.

The example shown in FIG. 7 further includes a lubrication port 706 shown on the mating surface 612. This illustrated port 706 includes a seal groove 708, which may receive a seal (not pictured). One or more passages (e.g., lubrication channels) may provide lubricating fluids to the mating surface 612, which may reduce friction between the mating surface 612 and the mating end 610. In embodiments, the fluid may be transported via the aperture 306. Furthermore, in embodiments, the lubricating fluids may be directed into a gap surrounding the knuckle 602 to provide lubricating fluids for the rotation of the outer surface 624 along the passage 420.

Figure 8:
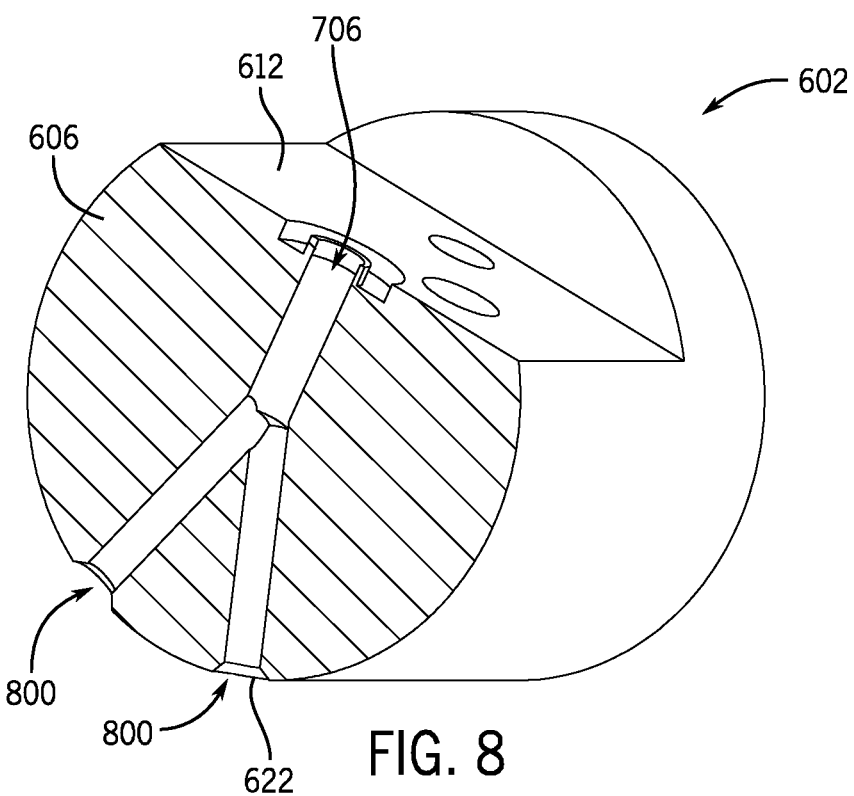
FIG. 8 is an isometric view of an embodiment of a knuckle, in accordance with embodiments of the present disclosure.

FIG. 8 is an isometric cross-sectional view of the knuckle 602 including lubrication channels 800 providing lubrication, such as a lubricating fluid, to the mounting surface 612 via the lubrication port 706. In this configuration, the lubrication channels 800 extend through the body 606 of the knuckle 602 from the fluid apertures 622. It should be appreciated that the configuration shown in FIG. 8 is for illustrative purposes only, and there may be more or less than two channels 800. Furthermore, the channels 800 may be arranged at any angle, may join at different locations, and the like. Furthermore, the channels 800 may not be in plane with one another. In operation, lubrication will provide a hydrodynamic cushion to the knuckle 602 and the knuckle cage 400. It should be appreciated that, in various embodiments, lubrication may be supplied at 706 with an outlet at 622.

Figure 9:
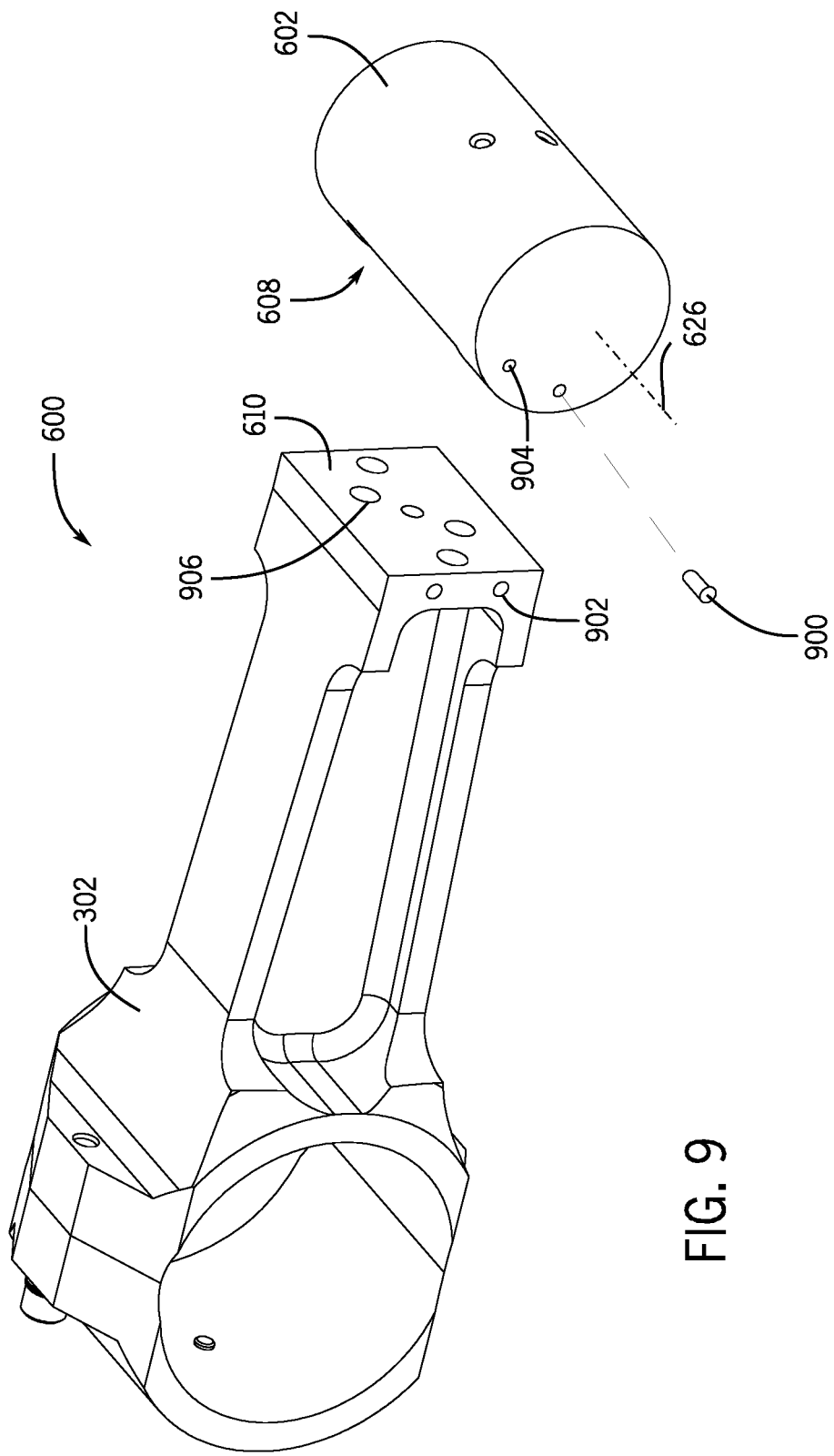
FIG. 9 is an isometric view of an embodiment of a connecting assembly, in accordance with embodiments of the present disclosure.

FIG. 9 is an isometric view of an embodiment of the connection assembly 600 illustrating an alternative or additive connection method. In this example, the illustrated mating end 610 is coupled to the knuckle 602 via retaining pins 900 extending radially inward along the axis 626. It should be appreciated that these pins 900 may be used in place of the fasteners 604 or in addition to the fasteners 604. In at least one embodiment, mating end 610 includes pin holes 902 that align with knuckle pin holes 904 when the mating end 610 is positioned within the recess 608. The pins 900 may then extend through the aligned holes 902, 904 to block separation of the mating end 610 from the knuckle 602. It should be appreciated that the alignment mechanisms, described above, may also be used to facilitate joining the mating end 610 to the knuckle 602. For example, the mating end 610 includes mating apertures 906, similar to the mating apertures 702 of the mounting surface 612 in FIG. 7, that may receive one or more rods or pins to align the components together. Accordingly, in operation, the pins 900 may be arranged to resist a shear force.

Figure 10:
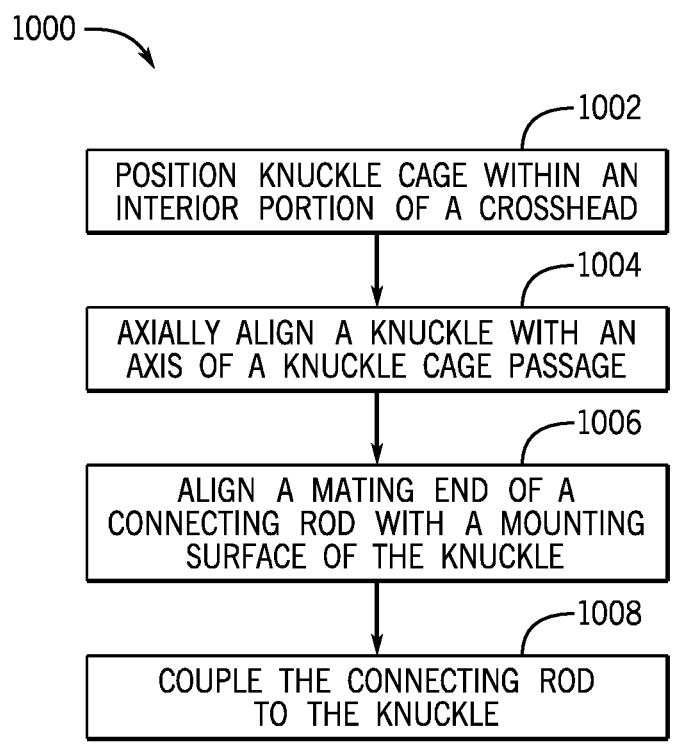
FIG. 10 is a flow chart of an embodiment of a method for coupling a connecting rod to a knuckle, in accordance with embodiments of the present disclosure.

FIG. 10 is a flow chart of an embodiment of a method 1000 for coupling a connecting rod to a crosshead. It should be appreciated that for this method, and any other method described herein, that there may be more or fewer steps. Furthermore, the steps may be performed in a different order, or in parallel, unless otherwise specifically stated. In this example, a knuckle cage is positioned within a crosshead 1002. For example, the knuckle cage may be aligned with an opening formed in the crosshead and then installed within an interior portion of the crosshead such along a passage extending between first and second ends of the crosshead. The knuckle may be secured to the crosshead in one or more embodiments, such as by using one or more fasteners or other coupling methods, such as a press fit, an interference fit, or the like. In one or more embodiments, installation of the knuckle cage may further include aligning one or more components, such as lubrication passages, openings, and the like.

In various embodiments, the knuckle is installed within the knuckle cage 1004. In at least one embodiment, the knuckle is installed in a manner that enables rotation about an axis. That is, in various embodiments, the knuckle cage may serve as a bearing or journal for the knuckle to rotate, such as along a surface of the knuckle cage. In at least one embodiment, the knuckle is axially aligned with the knuckle cage 1004. Furthermore, in at least one embodiment, the knuckle is installed to facilitate alignment of one or more components, such as aligning a knuckle mounting surface with an opening or accessible portion of the knuckle cage and/or crosshead.

In at least one embodiment, a mating end of a connecting rod is aligned with a mounting surface of the knuckle 1006. Alignment may include positioning one or more pins or extensions to mate or extend into mating apertures or grooves. In at least one embodiment, alignment may include positioning the connecting rod between edges that define an opening or recess in the knuckle. The connecting rod may be coupled to the knuckle 1008. In at least one embodiment, the coupling is an axial coupling. Axial coupling may include a coupling that is aligned perpendicular to a rotational axis of the knuckle. In at least one embodiment, axial coupling may include one or more threaded fittings, one or more pins, one or more claims, or various other coupling mechanisms that facilitate axial coupling. In at least one embodiment, coupling is performed radially or parallel to the rotational axis of the knuckle. For example, one or more pins may extend through the knuckle to mate with one or more apertures formed in the connecting rod. In at least one embodiment, both axial and radial coupling is utilized to secure the coupling rod to the knuckle. It should be appreciated that additional components may also be utilized and considered, such as alignment of flow passages for lubrication, which may lead to further adjustments or movement of various components of the system. In this manner, the connecting rod may be coupled to the knuckle.

The foregoing disclosure and description of the disclosed embodiments is illustrative and explanatory of the embodiments of the disclosure. Various changes in the details of the illustrated embodiments can be made within the scope of the appended claims without departing from the true spirit of the disclosure. The embodiments of the present disclosure should only be limited by the following claims and their legal equivalents.

The invention claimed is:

1. A connecting rod assembly, comprising:
a crosshead to connect a connecting rod to a plunger, the crosshead having a hole extending through the crosshead;
a knuckle cage positioned within the crosshead to extend through the hole of the crosshead, the knuckle cage including a passage and a cutout to provide access to the passage;
a knuckle positioned within the passage of the knuckle cage, the knuckle having a mounting surface that is substantially planar, the mounting surface including a mating end having a substantially planar mating end surface to connect to the connecting rod at the mating end, the knuckle cage being secured to the crosshead; and
one or more lock washers overlapping at least a portion of the knuckle cage to block movement of the knuckle cage in a direction perpendicular to a rotational axis of the knuckle.

2. A connecting rod assembly, comprising:
a crosshead to connect a connecting rod to a plunger, the crosshead having a hole extending through the crosshead;
a knuckle cage positioned within the crosshead to extend through the hole of the crosshead, the knuckle cage including a passage and a cutout to provide access to the passage;
a knuckle positioned within the passage of the knuckle cage, the knuckle having a mounting surface that is substantially planar, the mounting surface including a mating end having a substantially planar mating end surface to connect to the connecting rod at the mating end;
a lubrication passage extending between an outer portion of the knuckle cage and the mounting surface;
a first lubrication aperture formed in the crosshead; and
a second lubrication aperture positioned in the knuckle cage, the knuckle cage being installed within the hole such that the first lubrication aperture aligns with the second lubrication aperture and the second lubrication aperture directs a fluid toward a rotational surface of the knuckle cage, thereby to at least partially define a hydrodynamic cushion between the knuckle and the knuckle cage.

3. The connecting rod assembly of claim 2, further comprising:
a third lubrication aperture positioned in the knuckle, the third lubrication aperture fluidly connected to the rotational surface of the knuckle; and
one or more channels extending through the knuckle, the one or more channels positioned to direct a fluid to a lubrication port on the mounting surface.

4. A connecting rod assembly, comprising:
a crosshead to connect a connecting rod to a plunger, the crosshead having a hole extending through the crosshead;
a knuckle cage positioned within the crosshead to extend through the hole of the crosshead, the knuckle cage including a passage and a cutout to provide access to the passage; and
a knuckle positioned within the passage of the knuckle cage, the knuckle having a mounting surface that is substantially planar, the mounting surface including a mating end having a substantially planar mating end surface to connect to the connecting rod at the mating end, at least a portion of the knuckle comprising a hardened material selected to resist wear.

5. A connecting rod assembly, comprising:
a crosshead having an interior portion, a hole extending from a first end to a second end, and a pair of platforms positioned on opposite first and second sides of the hole;
a knuckle cage positioned within the hole and extending from the first end to the second end and having a cage axis extending substantially perpendicular to the pair of platforms, a pivot surface, and a recess positioned in the knuckle cage and extending through a body portion of the knuckle cage, thereby to provide access to the pivot surface of the knuckle cage from a direction perpendicular to the cage axis, the pivot surface at least partially defining at least a portion of a cage passage extending along the cage axis; and
a knuckle positioned within the cage passage, the knuckle being axially aligned with the cage axis such that the knuckle, responsive to a force, rotates about the cage passage, the knuckle having a planar mating surface positioned to align with the recess positioned in the knuckle cage.

6. The connecting rod assembly of claim 5, further comprising:
one or more receiving apertures positioned in the planar mating surface, the one or more receiving apertures positioned to receive mating fasteners from a connecting rod to couple the connecting rod to the knuckle.

7. The connecting rod assembly of claim 5, further comprising:
one or more receiving apertures positioned in the knuckle, the one or more receiving apertures positioned perpendicular to the cage axis, wherein the one or more receiving apertures receive one or more pins to connect a connecting rod to the knuckle.

8. The connecting rod assembly of claim 5, further comprising:
a pair of knuckle cage couplers secured to respective platforms on the first and second sides of the hole, each of the knuckle cage couplers extending, at least partially, over the knuckle cage to block axial movement of the knuckle cage in at least two directions.

9. The connecting rod assembly of claim 5, wherein a lubrication passage provides a lubricating fluid along the pivot surface of the knuckle cage.

10. The connecting rod assembly of claim 5, wherein the recess positioned in the knuckle cage has a recess length that is less than a knuckle cage length.

11. The connecting rod assembly of claim 5, further comprising:
one or more alignment apertures positioned in the knuckle, the one or more alignment apertures being perpendicular to the cage axis, wherein the one or more alignment apertures receive one or more pins associated with the knuckle.

12. The connecting rod assembly of claim 5, further comprising:
one or more fasteners extending from the knuckle, the one or more fasteners positioned perpendicular to the cage axis, wherein the one or more fasteners engage one or more apertures positioned in a connecting rod to couple the connecting rod to the knuckle.

13. A method, comprising:
positioning a knuckle cage within a crosshead;
positioning a knuckle within the knuckle cage;
aligning a substantially planar mating end of a connecting rod with a substantially planar mounting surface of the knuckle;
connecting the connecting rod to the knuckle;
aligning a first flow passage extending through the crosshead with a second flow passage extending through the knuckle cage; and
providing a lubricating fluid through the first flow passage and the second flow passage.

\* \* \* \* \*